US010972692B2

(12) United States Patent
Seo et al.

(10) Patent No.: US 10,972,692 B2
(45) Date of Patent: Apr. 6, 2021

(54) IMAGE SENSOR INCLUDING DIGITAL PIXEL

(71) Applicant: SAMSUNG ELECTRONICS CO., LTD., Suwon-si (KR)

(72) Inventors: Min-Woong Seo, Hwaseong-si (KR); Jaekyu Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/599,787

(22) Filed: Oct. 11, 2019

(65) Prior Publication Data

US 2020/0260043 A1 Aug. 13, 2020

(30) Foreign Application Priority Data

Feb. 12, 2019 (KR) ........................ 10-2019-0016277

(51) Int. Cl.
*H04N 5/3745* (2011.01)
*H04N 5/378* (2011.01)
*H04N 5/351* (2011.01)

(52) U.S. Cl.
CPC ......... *H04N 5/37452* (2013.01); *H04N 5/351* (2013.01); *H04N 5/378* (2013.01); *H04N 5/37457* (2013.01)

(58) Field of Classification Search
CPC ............... H04N 5/37452; H04N 5/378; H04N 5/37457; H04N 5/351
See application file for complete search history.

(56) References Cited

U.S. PATENT DOCUMENTS 6,525,304 B1 * 2/2003 Merrill .................. H04N 3/155
250/208.1
6,927,796 B2 8/2005 Liu et al.
(Continued)

FOREIGN PATENT DOCUMENTS

EP 2 093 997 B1 12/2017
KR 10-2017-0031645 A 3/2017

OTHER PUBLICATIONS

B. Fowler et al., "Techniques for Pixel Level Analog to Digital Conversion", SPIE Conference on Infrared Readout Electronics, 1998, vol. 3360, pp. 2-12.
(Continued)

*Primary Examiner* — Nhan T Tran
(74) *Attorney, Agent, or Firm* — Lee IP Law, PC

(57) ABSTRACT

An image sensor includes a plurality of pixels. Each of the plurality of pixels includes a photodetector that includes a photoelectric conversion element that outputs a detection signal in response to light incident thereon, a comparator that compares the detection signal of the photodetector with a ramp signal and outputs a comparison signal in response thereto, a plurality of first memory cells that store a first counting value corresponding to a first voltage level of the detection signal using the comparison signal of the comparator and output the first counting value through a plurality of transmission lines, and a plurality of second memory cells that store a second counting value corresponding to a second voltage level of the detection signal using the comparison signal of the comparator and output the second counting value through the plurality of transmission lines.

18 Claims, 22 Drawing Sheets

(56) References Cited

U.S. PATENT DOCUMENTS

| | | | |
|---|---|---|---|
| 6,975,355 B1 * | 12/2005 | Yang | H04N 1/00307 |
| | | | 348/302 |
| 7,911,518 B2 | 3/2011 | Yosefin | |
| 7,990,453 B2 | 8/2011 | Egawa | |
| 8,334,491 B2 | 12/2012 | Bogaerts et al. | |
| 8,354,630 B2 | 1/2013 | Hoshino | |
| 8,445,828 B2 | 5/2013 | He | |
| 8,502,155 B2 | 8/2013 | Ballabriga et al. | |
| 8,773,562 B1 | 7/2014 | Fan | |
| 8,946,610 B2 | 2/2015 | Iwabuchi et al. | |
| 9,041,579 B2 | 5/2015 | Meynants et al. | |
| 9,064,769 B2 | 6/2015 | Kozlowski | |
| 9,154,713 B2 | 10/2015 | Denham et al. | |
| 9,299,732 B2 | 3/2016 | Webster et al. | |
| 9,332,200 B1 | 5/2016 | Hseih et al. | |
| 9,398,237 B2 | 7/2016 | Brady et al. | |
| 9,652,575 B2 | 5/2017 | Shen | |
| 9,681,071 B2 | 6/2017 | Smith et al. | |
| 9,774,801 B2 | 9/2017 | Hseih et al. | |
| 9,818,791 B1 * | 11/2017 | Mao | H04N 5/379 |
| 9,986,194 B2 | 5/2018 | Maehashi | |
| 10,021,331 B2 | 7/2018 | Sakakibara et al. | |
| 2004/0141079 A1 | 7/2004 | Yamaguchi et al. | |
| 2015/0115134 A1 | 4/2015 | Solhusvik et al. | |
| 2015/0312491 A1 | 10/2015 | Egawa | |
| 2016/0360138 A1 * | 12/2016 | Meynants | H01L 27/14609 |
| 2017/0208273 A1 * | 7/2017 | Mandelli | H04N 5/3559 |
| 2017/0272678 A1 * | 9/2017 | Sakakibara | H01L 27/1464 |
| 2017/0317061 A1 | 11/2017 | Takahashi et al. | |
| 2017/0332022 A1 | 11/2017 | Zhou | |
| 2018/0204867 A1 | 7/2018 | Kim et al. | |
| 2018/0227522 A1 | 8/2018 | Ayers et al. | |
| 2019/0149754 A1 * | 5/2019 | Otaka | H04N 5/378 |
| | | | 348/296 |

OTHER PUBLICATIONS

D. Schor, "DM 2017: Sony's 3-layer stacked MOS image sensor technology", IEDM, 2017.

* cited by examiner

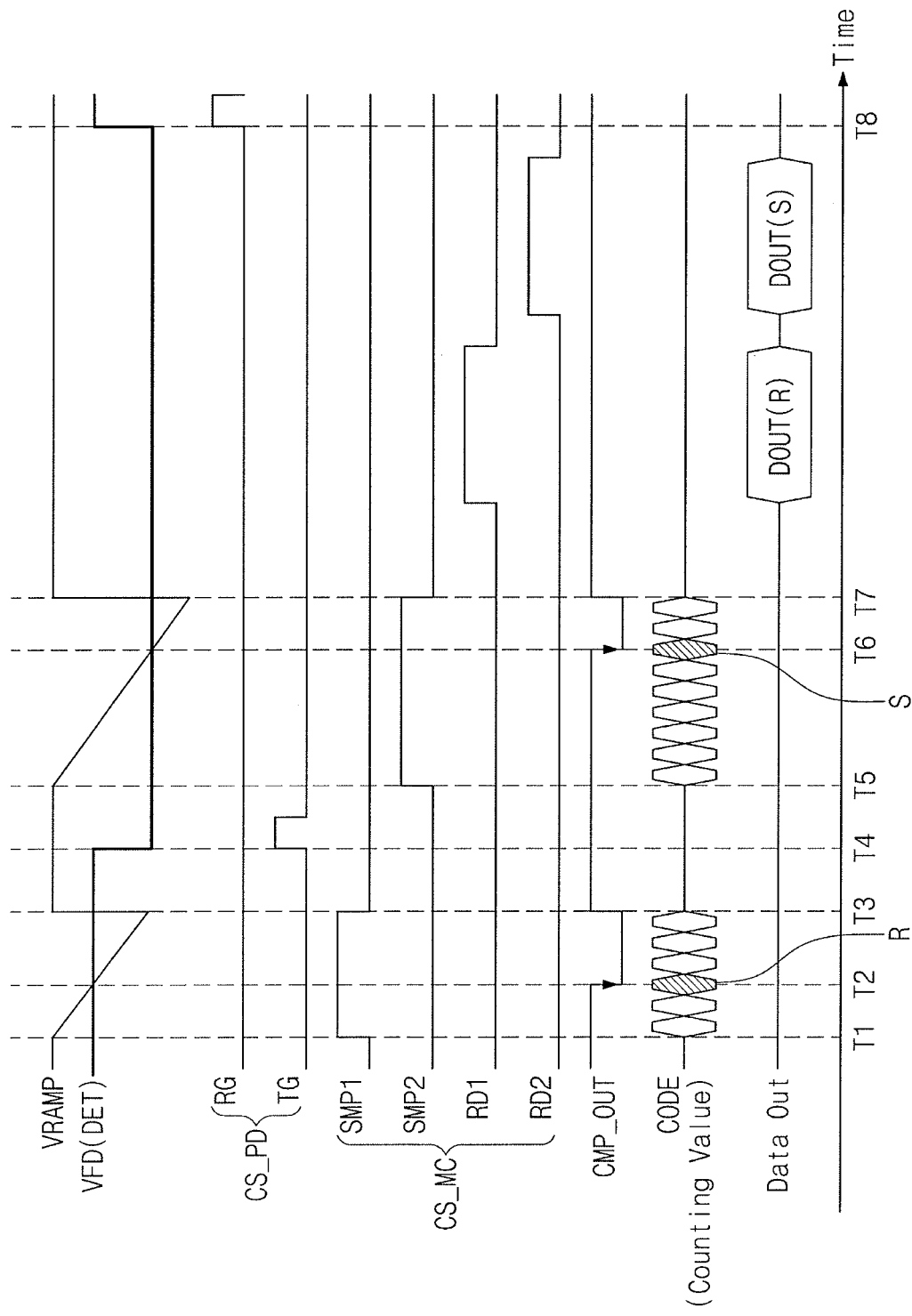

IMAGE SENSOR INCLUDING DIGITAL PIXEL

CROSS-REFERENCE TO RELATED APPLICATION

Korean Patent Application No. 10-2019-0016277, filed on Feb. 12, 2019, in the Korean Intellectual Property Office, and entitled: "Image Sensor Including Digital Pixel," is incorporated by reference herein in its entirety.

BACKGROUND

1. Field

Embodiments described herein relate to an image sensor including a digital pixel.

2. Description of the Related Art

An image sensor may convert an optical image into an electrical signal. As a computer industry and a communication industry develop, nowadays, there is an increasing demand on a high-performance image sensor in various electronic devices, e.g., a digital camera, a camcorder, a personal communication system (PCS), a game console, a security camera, a medical micro camera, etc.

SUMMARY

According to an exemplary embodiment, an image sensor includes a plurality of pixels. Each of the plurality of pixels includes a photodetector that includes a photoelectric conversion element that outputs a detection signal in response to light incident thereon, a comparator that compares the detection signal of the photodetector with a ramp signal and outputs a comparison signal in accordance therewith, a plurality of first memory cells that store a first counting value corresponding to a first voltage level of the detection signal using the comparison signal of the comparator and output the first counting value through a plurality of transmission lines, and a plurality of second memory cells that store a second counting value corresponding to a second voltage level of the detection signal using the comparison signal of the comparator and output the second counting value through the plurality of transmission lines.

According to an exemplary embodiment, an image sensor includes a plurality of pixels. Each of the plurality of pixels includes first to M-th subpixels each connected to a floating diffusion (FD) node, wherein M is a natural number of 2 or more, each of the first to M-th subpixels outputting a detection signal in response to light incident thereon, a comparator that compares a ramp signal with the detection signal generated at the FD node by one of the first to M-th subpixels and outputs a comparison signal in accordance therewith, a plurality of first memory cells that store first to M-th reset counting values respectively corresponding to first to M-th reset levels of the detection signal that are respectively determined by the first to M-th subpixels, using the comparison signal of the comparator, and a plurality of second memory cells that store first to M-th signal counting values respectively corresponding to first to M-th signal levels of the detection signal that are respectively determined by the first to M-th subpixels, using the comparison signal of the comparator.

According to an exemplary embodiment, an image sensor includes a plurality of pixels. Each of the plurality of pixels includes first to M-th subpixels each connected to a floating diffusion (FD) node, wherein M is a natural number of 2 or more, each of the first to M-th subpixels outputting a detection signal in response to light incident thereon, a comparator that compares a ramp signal with detection signals generated at the FD node by all the first to M-th subpixels and outputs a comparison signal in accordance therewith, a plurality of first memory cells that store a first counting value corresponding to a first voltage level of the detection signal using the comparison signal of the comparator, and a plurality of second memory cells that store a second counting value corresponding to a second voltage level of the detection signal using the comparison signal of the comparator.

BRIEF DESCRIPTION OF THE DRAWINGS

Features will become apparent to those of skill in the art by describing in detail exemplary embodiments with reference to the attached drawings in which:

FIGS. 5 and 6 illustrate timing diagrams for describing an operation of a digital pixel of FIG. 4A.

DETAILED DESCRIPTION

Figure 1:
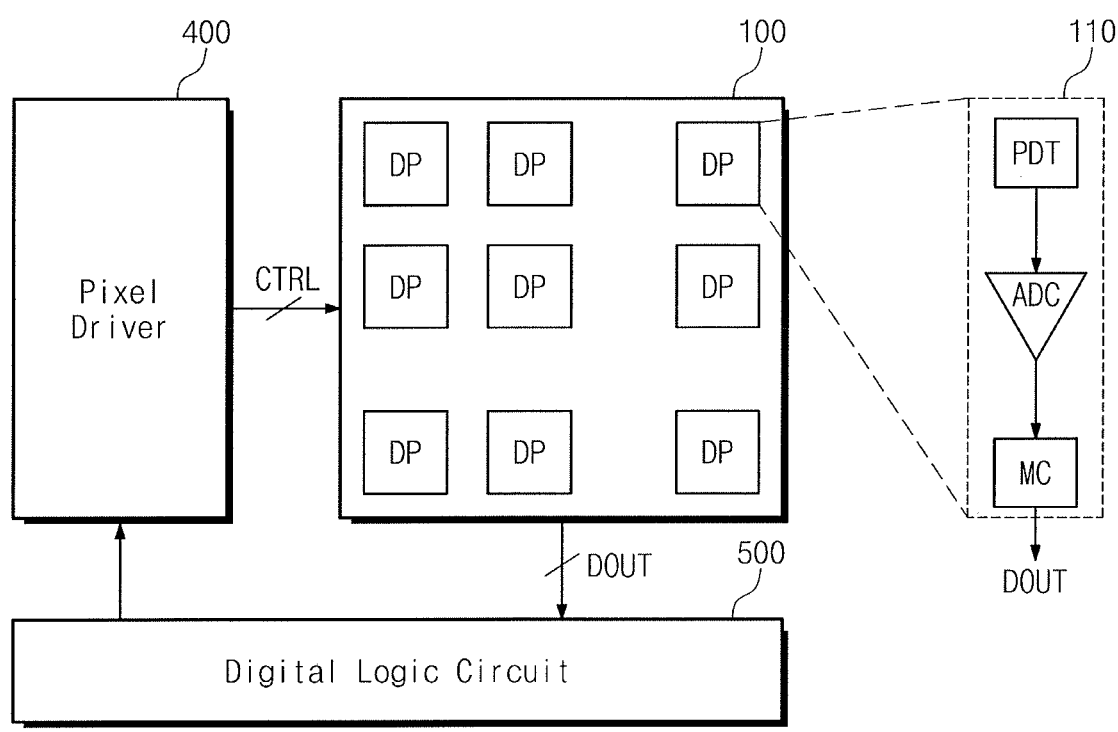
FIG. 1 illustrates an image sensor according to one embodiment.

FIG. 1 illustrates an image sensor according to one embodiment. An image sensor 10 may include a pixel array 100, a pixel driver 400, and a digital logic circuit 500.

The pixel array 100 may include digital pixels 110, each of which senses external light, stores data corresponding to the sensed light, and outputs the data. The digital pixel 110 may include a photodetector PDT, an analog-to-digital converter ADC, and memory cells MC.

The photodetector PDT may detect external light and may output a detection signal. The analog-to-digital converter ADC may convert the detection signal (e.g., an analog signal) detected by the photodetector PDT into a digital signal. The memory cells MC may store the data corresponding to the detection signal. The memory cells MC may output the stored data to the digital logic circuit 500 as output data DOUT.

The pixel driver 400 may output a control signal CTRL for controlling the pixel array 100 under control of the digital logic circuit 500. The digital logic circuit 500 may perform digital signal processing on the output data DOUT received from the pixel array 100 and may provide a final image to an external device (e.g., an image signal processor (ISP) or an application processor (AP)).

Unlike an analog pixel, each of the digital pixels 110 may store data, e.g., digital data, corresponding to the detection signal detected by the photodetector PDT at a pixel level. Accordingly, an area, time, and power consumption needed to store data in the digital pixels 110, to read the stored data, or to process the read data may be improved.

Figure 2:
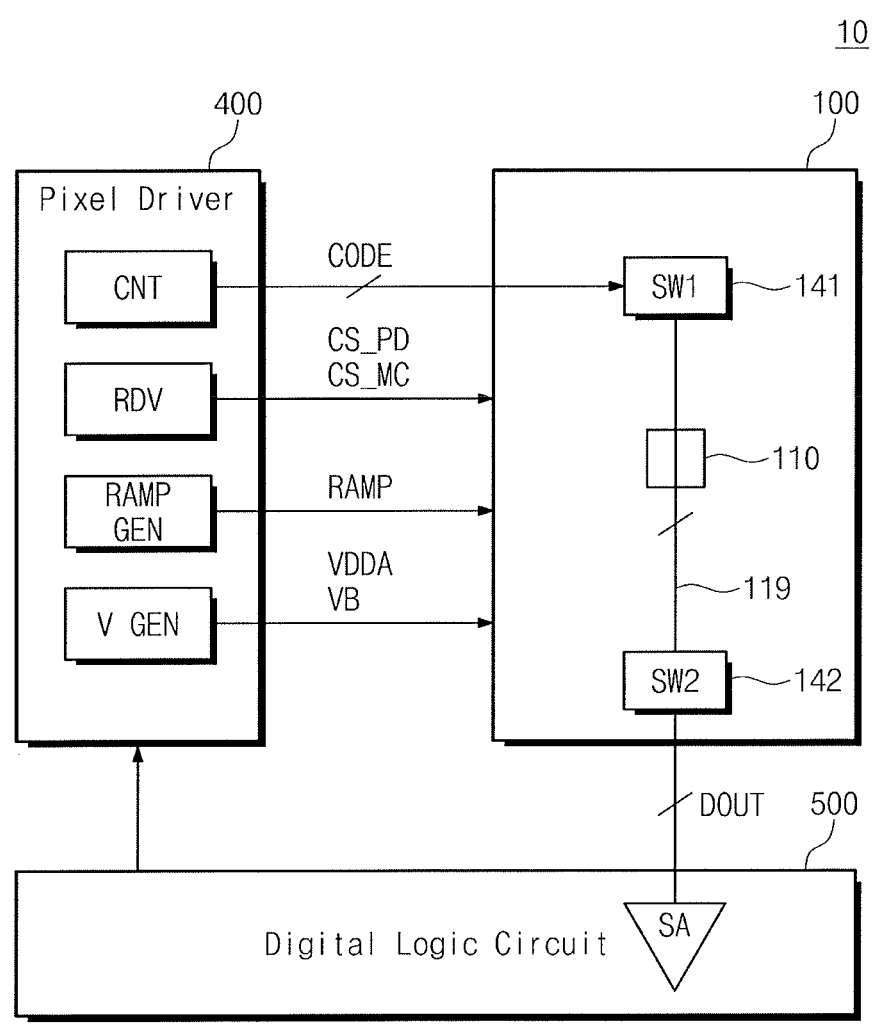
FIG. 2 illustrates the image sensor of FIG. 1 in detail.

FIG. 2 illustrates the image sensor 10 of FIG. 1 in detail. The pixel driver 400 may include a row driver RDV, a counter CNT, a ramp generator RAMP GEN, and a voltage generator V GEN. The row driver RDV may select the digital pixels 110 in the unit of a row. The row driver RDV may output a photodetector control signal CS_PD and a memory control signal CS_MC.

Under control of the digital logic circuit 500, the counter CNT may initiate or start a counting operation as a voltage level VRAMP of a ramp signal RAMP varies. When the voltage level VRAMP of the ramp signal RAMP starts to vary, the counter CNT may sequentially increase or decrease a value (i.e., a counting value) of a code "CODE" every period of a clock signal. The value of the code "CODE" may sequentially vary over time. The value of the code "CODE" may be (inversely) proportional to the voltage level VRAMP of the ramp signal RAMP.

Under control of the digital logic circuit 500, the ramp generator RAMP GEN may output the ramp signal RAMP that is a signal (e.g., an increasing/decreasing signal having a constant slope) increasing or decreasing constantly. The ramp signal RAMP may be compared with a detection signal detected by the photodetector PDT and may be referred to as a "reference signal". For example, the ramp generator RAMP GEN may be implemented by using an integrator.

The voltage generator V GEN may generate various voltages that are required for the image sensor 10 to operate. The voltage generator V GEN may supply analog voltages (e.g., a power supply voltage VDDA and a bias voltage VB) to circuits that process an analog signal within the digital pixel 110 and may supply a digital voltage to circuits that process a digital signal within the digital pixel 110. The photodetector control signal CS_PD, the memory control signal CS_MC, the code "CODE", and the ramp signal VRAMP may be included in the control signal CTRL described with reference to FIG. 1.

In an embodiment, the code "CODE" may be an N-bit code, the number of transmission lines 119 may be "N" (e.g., one bit being transferred per transmission line). The transmission line can be referred to as a transfer line. The digital pixel 110 may be provided with the code "CODE" from the counter CNT through a first switch circuit 141 and the plurality of transmission lines 119. The digital pixel 110 may latch and store a reset counting value and a signal counting value respectively corresponding to a reset level and a signal level of the detection signal detected by the photodetector, based on the code "CODE". The reset counting value and the signal counting value may be used for correlated double sampling CDS that is performed by the digital logic circuit 500. The digital pixel 110 may output the reset counting value and the signal counting value as the output data DOUT to the digital logic circuit 500 through the plurality of transmission lines 119 and a second switch circuit 142. The plurality of transmission lines 119 may be shared by one or more digital pixels arranged along a direction in which the plurality of transmission lines 119 extend (i.e., a row direction or a column direction) or are connected to the plurality of transmission lines 119.

The first switch circuit 141 may electrically connect the counter CNT to the plurality of transmission lines 119 so that the code "CODE" is transferred to the digital pixel 110. The second switch circuit 142 may electrically connect the plurality of transmission lines 119 to a sense amplifier SA of the digital logic circuit 500 so that the reset counting value and the signal counting value stored in the digital pixel 110 are transferred to the sense amplifier SA. As illustrated in FIG. 2, the first switch circuit 141 is included in the pixel array 100, but may be at any position of the image sensor 10.

When the first switch circuit 141 electrically connects the counter CNT to the plurality of transmission lines 119, the second switch circuit 142 may be turned off and may not electrically connect the sense amplifier SA to the plurality of transmission lines 119. In contrast, when the second switch circuit 142 electrically connects the sense amplifier SA to the plurality of transmission lines 119, the first switch circuit 141 may be turned off and may not electrically connect the counter CNT to the plurality of transmission lines 119. The first and second switch circuits 141 and 142 may decrease the number of transmission lines that are used to transfer the code "CODE" to the digital pixel 110 and to read the reset counting value and the signal counting value from the digital pixel 110.

The sense amplifier SA may sense and amplify the output data DOUT transferred through the plurality of transmission lines 119. The plurality of transmission lines 119 illustrated in FIG. 2 may correspond to one group, a plurality of transmission line groups may be arranged in the pixel array 100, and the number of sense amplifiers SA may be one or more depending on the number of the plurality of transmission lines 119.

Figure 3:
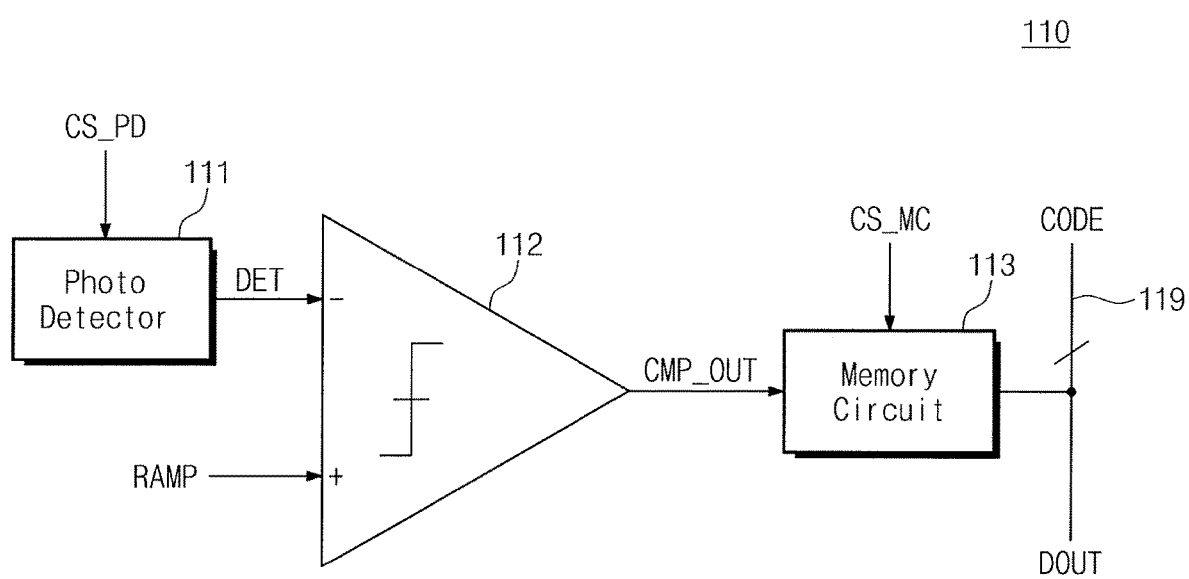
FIG. 3 illustrates a digital pixel of FIG. 1.

FIG. 3 illustrates the digital pixel 110 of FIG. 1. The digital pixel 110 may operate in response to signals CTRL (e.g., CS_PD, CS_MC, CODE, and VRAMP) output from the pixel driver 400. The digital pixel 110 may include a photodetector 111, a comparator 112, and a memory circuit 113.

The photodetector 111 may detect external light and may generate a detection signal DET corresponding to the detected light. The detection signal DET may be an analog signal.

The comparator 112, e.g., a 1-bit ADC or a differential amplifier, may compare the detection signal DET with the ramp signal RAMP. The comparator 112 may be also referred to as a "single-slope ADC". The comparator 112 may be an amplifier that receives the detection signal DET through a (−) input terminal and receives the ramp signal RAMP through a (+) input terminal, or vice versa. The voltage level VRAMP of the ramp signal RAMP may decrease or increase with a predetermined slope (or linearly) during a predetermined time. When the voltage level VRAMP of the ramp signal RAMP reaches a voltage level VFD of the detection signal DET (when the voltage level VRAMP is less or greater than the voltage level VFD), the comparator 112 may change a logic state (or a phase) of a comparison signal CMP_OUT. When the voltage level VRAMP reaches a reset level and a signal level of the detection signal DET, the comparator 112 may change a logic state of the comparison signal CMP_OUT so that the memory circuit 113 latches a reset counting value and a signal counting value respectively corresponding to the reset level and the signal level of the detection signal DET.

The memory circuit 113 may store the code "CODE" corresponding to the detection signal DET in response to the comparison signal CMP_OUT and the memory control signal CS_MC. The memory circuit 113 may output the reset counting value and the signal counting value as the output data DOUT in response to the memory control signal CS_MC.

Figure 4A:
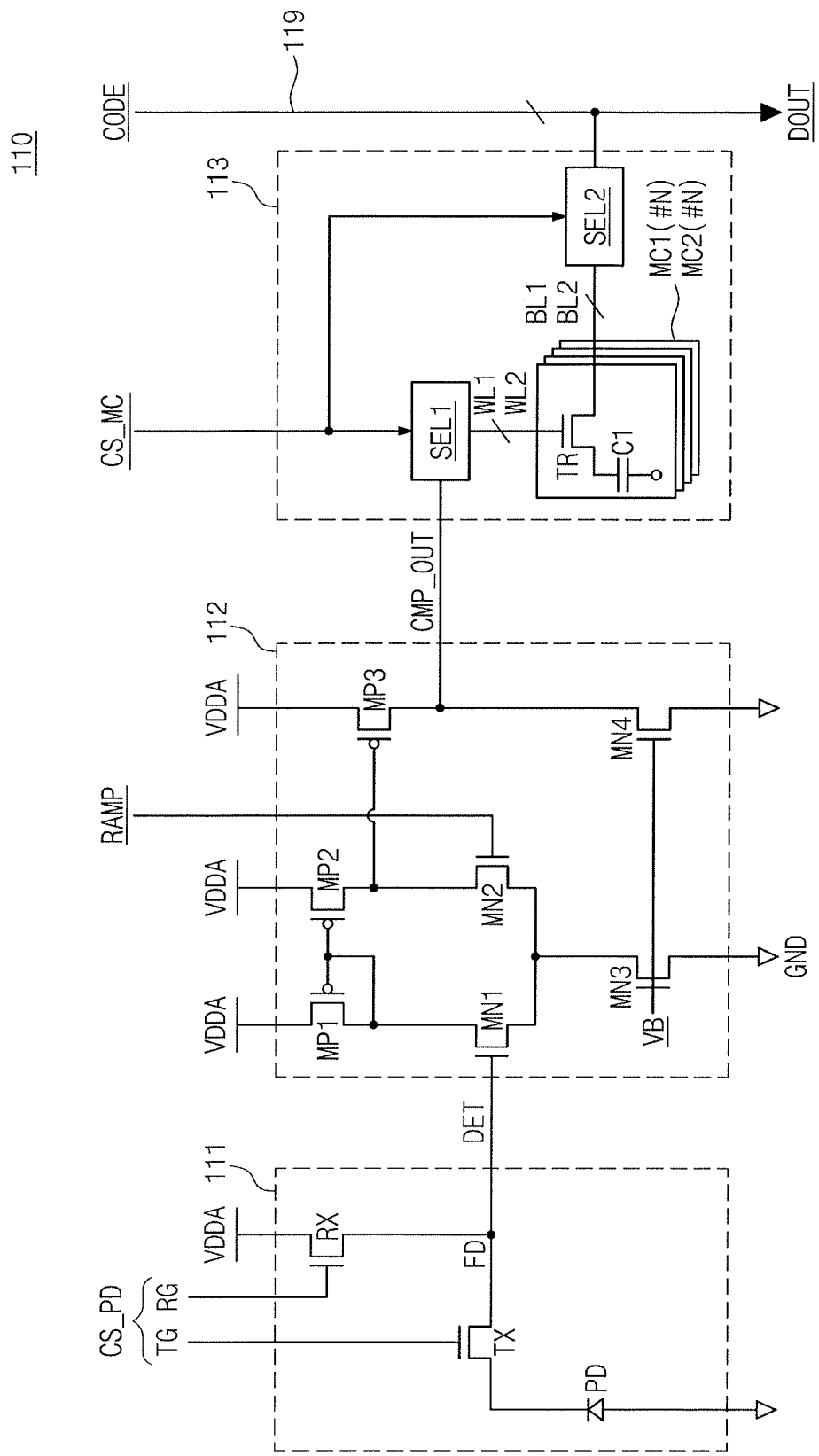
FIGS. 4A to 4C illustrate circuit diagrams of the digital pixel of FIG. 3.
Figure 4B:
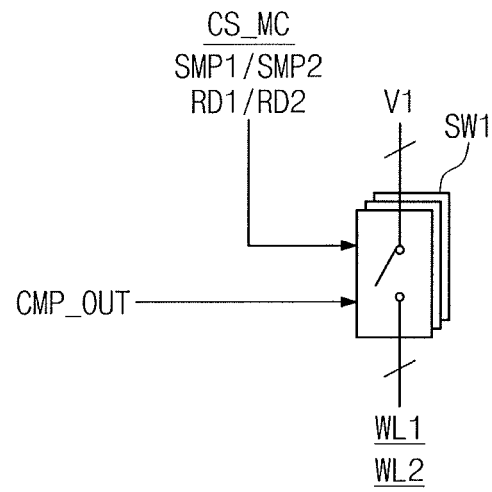
Figure 4C:
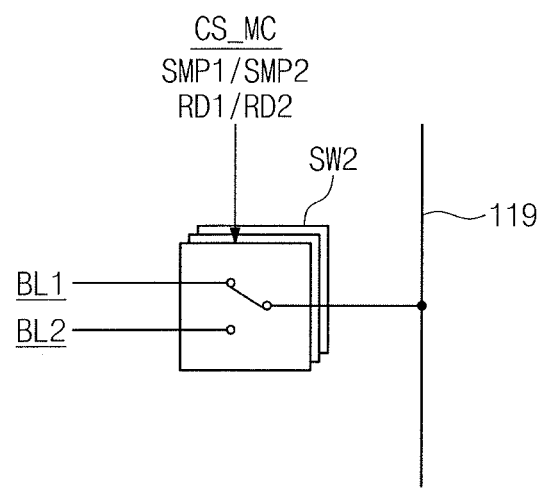

FIGS. 4A to 4C are circuit diagrams illustrating the digital pixel 110 of FIG. 3. Below, a structure, components, and an operation of the digital pixel 110 will be described with reference to exemplary circuit diagrams.

The photodetector 111 may include a photoelectric conversion element PD. The photoelectric conversion element may generate and accumulate charges in proportion to the amount of light incident thereon. The photoelectric conversion element may convert an incident light into an electrical signal. For example, the photoelectric conversion element may be a photodiode (PD), a phototransistor, a photogate, a pinned photodiode (PPD), or a combination thereof. In an embodiment, an example is illustrated in FIG. 4A as the photoelectric conversion element PD is the photodiode The photodetector 111 may include one or more transistors TX and RX configuring a readout circuit in addition to the photoelectric conversion element. The transfer transistor TX may electrically connect the photoelectric conversion element PD to a floating diffusion (FD) node based on a transfer signal TG. The transfer transistor TX may be turned on or turned off by the transfer signal TG. The transfer transistor TX may transfer charges (or electrons) accumulated in the photoelectric conversion element PD to the FD node. The amount of charges "Q" of the FD node transferred through the transfer transistor TX may be converted into a voltage difference ($=Q/C_{FD}$) by a capacitance $C_{FD}$ of the FD node. The voltage level VFD of the detection signal DET may correspond to a voltage level of the FD node.

The reset transistor RX may reset the FD node to a power supply voltage VDDA based on a reset signal RG. The reset transistor RX may discharge charges (or electrons) accumulated in the FD node. The reset transistor RX may be turned on or turned off by the reset signal RG. When the reset transistor RX and the transfer transistor TX are turned on, charges (or electrons) of the photoelectric conversion element PD may be discharged, and thus, the photoelectric conversion element PD may be reset.

The comparator 112 may include transistors MN1 to MN4 and MP1 to MP3. Gates of the transistors MN1 and MN2 may be input terminals of the comparator 112, e.g., a differential amplifier, and may be provided with the detection signal DET and the ramp signal RAMP, respectively. Sources of the transistors MN1 and MN2 may be electrically connected to each other and may be biased by the transistor MN3 serving as a current source. A gate of the transistor MN3 may receive the bias voltage VB, such that a bias current according to the bias voltage VB may flow through the transistor MN3.

The transistor MP1 may be connected between the power supply voltage VDDA and a drain of the transistor MN1. The transistor MP2 may be connected between the power supply voltage VDDA and a drain of the transistor MN2. For example, the power supply voltage VDDA supplied to the comparator 112 may be an analog voltage that is different from a digital power supply voltage(s) to be supplied to any other components MC1, MC2, SEL1, 141, and 142. A drain of the transistor MP1 may be connected to the drain of the transistor MN1. The drain of the transistor MN1, a gate and a drain of the transistor MP1, and a gate of the transistor MP2 may be connected to each other. The transistors MP1 and MP2 may configure a current mirror load.

The transistors MN1, MN2, MN3, MP1, and MP2 may amplify a difference between the voltage level VFD of the floating diffusion (FD) node and the voltage level VRAMP of the ramp signal RAMP. A voltage level of the drains of the transistors MN1 and MN2 may be determined according to the voltage level VRAMP and the voltage level VFD. A gate of the transistor MP3 may be provided with a voltage level of the drains of the transistors MN2 and MP2. Operation of the transistor MN4 may be similar to the operation of the transistor MN3. As in an inverter, the transistors MN4 and MP3 may invert the voltage level of the drains of the transistors MN2 and MP2 and may generate the comparison signal CMP_OUT. For example, when the voltage level VRAMP is greater (higher) than the voltage level VFD, a level of the comparison signal CMP_OUT may be a level of the power supply voltage VDDA corresponding to logic "1". When the voltage level VRAMP reaches the voltage level VFD or is less (lower) than the voltage level VFD, the level of the comparison signal CMP_OUT may switch from the level of the power supply voltage VDDA to a level of a power supply voltage GND corresponding to logic "0".

The types N-type and P-type of the above transistors MN1 to MN4 and MP1 to MP3 and a voltage (or logical) level according to the voltage levels VRAMP and VFD are only exemplary. When a comparison result between the voltage level VRAMP and the voltage level VFD changes, i.e., when the voltage level VRAMP of the ramp signal RAMP crosses the voltage level VFD of the FD node, the a level of the comparison signal CMP_OUT may also change. The number of transistors that configure the comparator 112 is not limited to the example illustrated in FIG. 4A.

The memory circuit 113 may operate in response to the comparison signal CMP_OUT and the memory control signal CS_MC. The memory circuit 113 may include a selection circuit SEL1, a selection circuit SEL2, and memory cells MC1 and MC2. The memory cells MC1 may store a reset counting value corresponding to a reset level of the detection signal DET. The memory cells MC2 may store a signal counting value corresponding to a signal level of the detection signal DET.

Each of the memory cells MC1 and MC2 may be a dynamic random access memory (DRAM) cell (having a 1T1C cell structure) including a transistor TR and a capacitor C1. The transistor TR of the memory cell MC1 may electrically connect a bit line BL1 to the capacitor C1 based on a signal of a word line WL1. The transistor TR of the memory cell MC2 may electrically connect a bit line BL2 to the capacitor C1 based on a signal of a word line WL2. Each of the memory cells MC1 and MC2 may store one bit. The number of memory cells MC1 may be "N" (N being a natural number) and the number of memory cells MC2 may be "N". For example, the number of memory cells MC1, the number of memory cells MC2, and the number of the plurality of transmission lines 119 may be the same as each other, e.g., "N". However, the number of memory cells MC1, the number of memory cells MC2, and the number of the plurality of transmission lines 119 may be different from each other.

Referring to FIG. 4B, the selection circuit SEL1 may control the word lines WL1 and WL2 in response to the comparison signal CMP_OUT and the memory control signal CS_MC. The selection circuit SEL1 may include first switches SW1. Each of the first switches SW1 may provide a first voltage V1 to first word lines WL1 or second word lines WL2 in response to the comparison signal CMP_OUT and the memory control signal CS_MC. The first voltage V1 may be a high voltage enough to turn on the transistor TR of each of the memory cells MC1 and MC2.

The memory control signal CS_MC may include first and second sampling signals SMP1 and SMP2 and first and second read signals RD1 and RD2. The first sampling signal SMP1 may be a signal for storing a reset sampling value in the memory cells MC1, and the second sampling signal SMP2 may be a signal for storing a signal sampling value in the memory cells MC2. The first read signal RD1 may be a signal for outputting the reset sampling value stored in the memory cells MC1 as the output data DOUT, and the second read signal RD2 may be a signal for outputting the signal sampling value stored in the memory cells MC2 as the output data DOUT. However, the memory control signal CS_MC for controlling the memory circuit 113 may be variously changed or modified.

When a level of the comparison signal CMP_OUT is switched while the first sampling signal SMP1 is activated, the first switches SW1 may select (activate) the memory cells MC1 by turning on the transistors TR of the memory cells MC1 and may not select the memory cells MC2 by turning off the transistors TR of the memory cells TR2. The first switch circuit 141 may electrically connect the counter CNT to the plurality of transmission lines 119 when the first sampling signal SMP1 is activated. The memory cells MC1 may store, as a reset sampling value, a value of the code "CODE" when a level of the comparison signal CMP_OUT is switched while the first sampling signal SMP1 is activated.

When a level of the comparison signal CMP_OUT is switched while the second sampling signal SMP2 is activated, the first switches SW1 may select the memory cells MC2 by turning on the transistors TR of the memory cells MC2 and may not select the memory cells MC1 by turning off the transistors TR of the memory cells MC1. The first switch circuit 141 may electrically connect the counter CNT to the plurality of transmission lines 119 during a time when the second sampling signal SMP2 is activated. The memory cells MC2 may store, as a signal sampling value, a value of the code "CODE" at a time when a level of the comparison signal CMP_OUT is switched while the second sampling signal SMP2 is activated.

When the first read signal RD1 is activated, the selection circuit SEL1 may select the memory cells MC1 and may not select the memory cells MC2. When the second read signal RD2 is activated, the selection circuit SEL1 may select the memory cells MC2 and may not select the memory cells MC1. When the first or second read signal RD1 or RD2 is activated, the second switch circuit 142 may electrically connect the plurality of transmission lines 119 to the sense amplifier SA. The reset sampling value stored in the memory cells MC1 may be output to the sense amplifier SA. The signal sampling value stored in the memory cells MC2 may be output to the sense amplifier SA. When the counting value stored in the memory cells MC1 or MC2 is output, the memory cells MC1 or MC2 may be respectively selected by the first or second read signal RD1 or RD2 regardless of the comparison signal CMP_OUT.

Referring to FIG. 4C, the selection circuit SEL2 may include second switches SW2 that electrically connect ones of the bit lines BL1 and bit lines BL2, to the plurality of transmission lines 119 in response to the memory control signal CS_MC. The second switches SW2 may perform a switching operation between the bit lines BL1, the bit lines BL2, and the plurality of transmission lines 119 in response to the memory control signal CS_MC (e.g., SMP1, SMP2, RD1, and RD2).

When the first sampling signal SMP1 is activated, the second switches SW2 may connect the bit lines BL1 to the plurality of transmission lines 119. The code "CODE" may be provided to the memory cells MC1 through the plurality of transmission lines 119, the second switches SW2, and the bit lines BL1. When the second sampling signal SMP2 is activated, the second switches SW2 may connect the bit lines BL2 to the plurality of transmission lines 119. The code "CODE" may be provided to the memory cells MC2 through the plurality of transmission lines 119, the second switches SW2, and the bit lines BL2.

When the first read signal RD1 is activated, the second switches SW2 may connect the bit lines BL1 to the plurality of transmission lines 119. The reset sampling value stored in the memory cells MC1 may be output as the output data DOUT through the plurality of transmission lines 119. When the second read signal RD2 is activated, the second switches SW2 may connect the bit lines BL2 to the plurality of transmission lines 119. The signal sampling value stored in the memory cells MC2 may be output as the output data DOUT through the plurality of transmission lines 119.

In an embodiment, the selection circuits SEL1 and SEL2 may control a plurality of memory cells included in any other digital pixels configured to operate at the same timing. In other words, at least two or more digital pixels of a plurality of digital pixels may share the selection circuits SEL1 and SEL2 that are separately provided. In this case, a memory circuit of each of the at least two or more digital pixels may not include the selection circuits SEL1 and SEL2.

In an embodiment, terminals (i.e., drains) of the transistor TR of the memory cell MC1 in the digital pixel 110 may be respectively connected to the plurality of transmission lines 119. Terminals (i.e., drains) of the transistor TR of the memory cell MC2 in the digital pixel 110 may be respectively connected to the plurality of transmission lines 119. Two memory cells MC1 and MC2 may be connected to one transmission line of the plurality of transmission lines 119. One of the two memory cells MC1 and MC2 connected to one transmission line may be selected by the selection circuit SEL1, and the other thereof may not be selected by the selection circuit SEL1. Unlike the example of FIG. 4A, the digital pixel 110 may not include the selection circuit SEL2.

Figure 6:
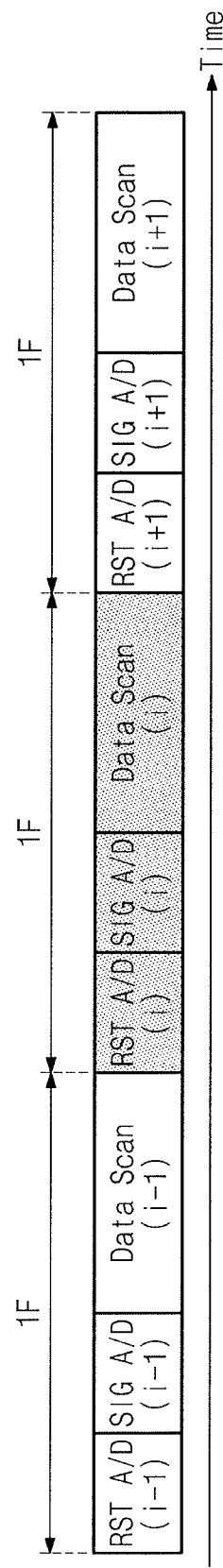

FIGS. 5 and 6 are timing diagrams for describing an operation of a digital pixel of FIG. 4A. For brevity of illustration and for convenience of description, components that are unnecessary to describe embodiments, and the timing diagrams of FIGS. 5 and 6 are only exemplary.

Before a time (point) T1, both the photoelectric conversion element PD and the FD node may be reset, and the voltage level VFD of the detection signal DET may be set to a reset level. The voltage level VRAMP of the ramp signal RAMP may decrease (or increase) at a predetermined slope from the time T1 to a time T3. The first sampling signal SMP1 may be activated from the time T1 to the time T3. A time period (interval) when the first sampling signal SMP1 is activated may correspond to a time period when the voltage level VRAMP decreases at a predetermined slope for sampling the reset level. The voltage level VRAMP may start to vary from the time T1 and the counter CNT may initiate or start a counting operation from the time T1. A counting value "R" of the code "CODE" may be proportional (or inversely proportional) to or may correspond to the voltage level VRAMP varying over time.

At a time T2, the voltage level VRAMP reaches the voltage level VFD, and becomes less (lower) than the voltage level VFD immediately after the time T2. At the time T2, the comparison signal CMP_OUT may switch from logic high (or low) to logic low (or high). Bits of the counting value "R" of the code "CODE" at the time T2 when the level of the comparison signal CMP_OUT is switched while the first sampling signal SMP1 is activated may be respectively stored in the memory cells MC1 as the reset counting value.

A time period from the time T1 to the time T3 detects the reset level of the photodetector 111. At the time T3, the voltage level VRAMP may be changed (reset) to an initial (or reset) level again, and a voltage level of the comparison signal CMP_OUT may also be changed (reset) to an initial level again. At a time T4, to detect a signal level of the photodetector 111, the transfer signal TG may be activated during a predetermined time to turn on the transfer transistor TX. As charges accumulated in the photoelectric conversion element PD are provided to the FD node through the transfer transistor TX, the voltage level VFD may change from the reset level to a signal level.

From a time T5 to a time T7, the voltage level VRAMP may decrease at a predetermined slope for detecting the signal level of the photodetector 111. The second sampling signal SMP2 may be activated from the time T5 to the time T7. A time period when the second sampling signal SMP2 is activated may correspond to a time period when the voltage level VRAMP decreases at a predetermined slope for sampling the signal level. The voltage level VRAMP may start to vary from the time T5 and the counter CNT may initiate a counting operation from the time T5 again.

At a time T6, the voltage level VRAMP reaches the voltage level VFD, and becomes less (lower) than the voltage level VFD immediately after the time T6. At the time T6, the comparison signal CMP_OUT may switch from logic high to logic low. Bits of a counting value "S" of the code "CODE" at the time T6 when the level of the comparison signal CMP_OUT is switched while the second sampling signal SMP2 is activated may be respectively stored in the memory cells MC2 as the signal counting value.

A time period from the time T5 to the time T7 detects the signal level of the photodetector 111. At the time T7, the voltage level VRAMP may be changed (reset) to the initial level again, and a voltage level of the comparison signal CMP_OUT may also be changed (reset) to the initial level again. The reset counting value "R" stored in the memory cells MC1 and the signal counting value "S" stored in the memory cells MC2 may be respectively read during a time period from the time T7 to a time T8. The reset counting value "R" stored in the memory cells MC1 may be read while the first read signal RD1 is activated. The signal counting value "S" stored in the memory cells MC2 may be read while the second read signal RD2 is activated. An order in which the values "R" and "S" are read is not limited to the example of FIG. 5, and the same transmission lines 119 may be shared to read the reset counting value "R" and to read the signal counting value "S". The digital pixel 110 may repeatedly perform the operations from the time T1 to the time T8.

Referring to FIG. 6, "i" that is a natural number may represent an i-th frame. A frame that is input to the pixel array 100 of the image sensor 10 may be repeatedly read. For example, a time necessary to read one frame may be a 1F time.

The 1F time may be divided into a time period RST A/D (a time period before the time T3 of FIG. 5) to reset all digital pixels 110 of a pixel array and convert reset levels of all the digital pixels 110 into reset counting values, a time period SIG A/D (from the time T3 to the time T7 of FIG. 5) to convert signal levels of all the digital pixels 110 into signal counting values, and a time period Data Scan (from the time T7 to the time T8 of FIG. 5) to read the reset counting values and the signal counting values stored in all the digital pixels 110.

During the time period RST A/D, resetting the digital pixels 110 may be performed simultaneously or sequentially (e.g., in the unit of a row). Storing the reset counting values of the digital pixels 110 in the memory cells MC1 may be performed simultaneously or sequentially (e.g., in the unit of a row). During the time period SIG A/D, storing the signal counting values of the digital pixels 110 in the memory cells MC2 may be performed simultaneously or sequentially (e.g., in the unit of a row). During the time period Data Scan, the reset counting values stored in the digital pixels 110 arranged along one row or belonging to one row may be output (in parallel), and then, the signal counting values stored in the digital pixels 110 arranged along the one row or belonging to the one row may be output (in parallel). In an implementation, the signal counting values may be output prior to the reset counting values. A read operation may be performed on other digital pixels 110 arranged along a next adjacent row or belonging to a next adjacent row.

FIGS. 7A to 7D illustrate digital pixels according to embodiments. Various structures of digital pixels 110a to 110d according to an embodiment will be described with reference to FIGS. 7A to 7D. With regard to components that are the same as or similar to the above components, additional description will be omitted to avoid redundancy.

Figure 7A:
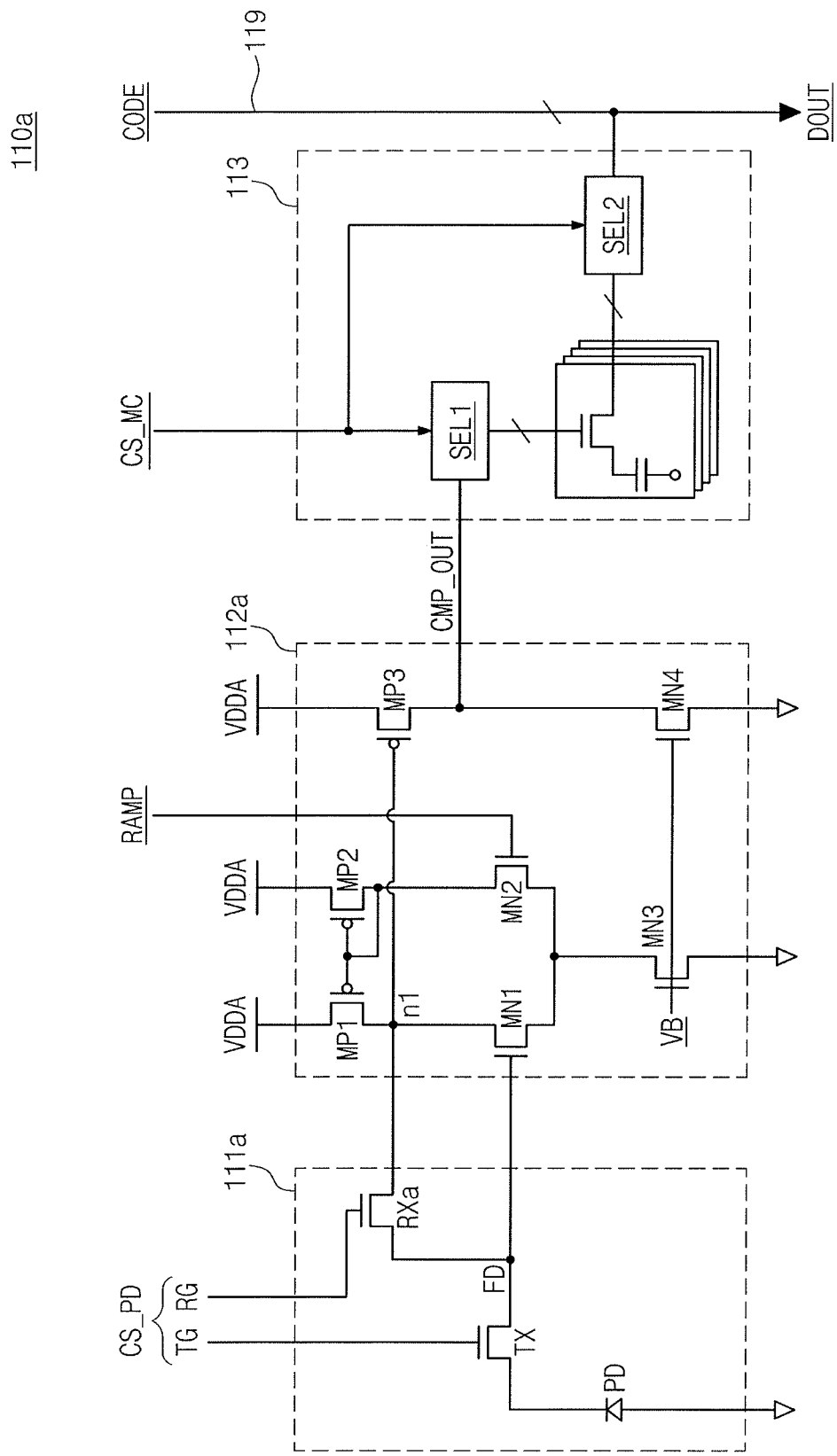
FIGS. 7A to 7D illustrate digital pixels according to embodiments.

Referring to FIG. 7A, a photodetector 111a may include a reset transistor RXa. Unlike the reset transistor RX, the reset transistor RXa may be connected between the FD node and a first node n1. The first node n1 is between the PMOS transistor MP1 and the NMOS transistor MN1 of a comparator 112a. When the voltage level VRAMP is set to a reset level (e.g., VDDA) and the reset transistor RXa and the transfer transistor TX are turned on, charges accumulated in the FD node and the photoelectric conversion element PD may be discharged to the power supply voltage VDDA through the transfer transistor TX, the reset transistor RXa, and the transistor MP1. Thus, the FD node and the photoelectric conversion element PD may be reset. Operation of the digital pixel 110a may be similar to the operation of the digital pixel 110 except for a connection structure of the reset transistor RXa and except that the comparison signal CMP_OUT is inverted.

Figure 7B:
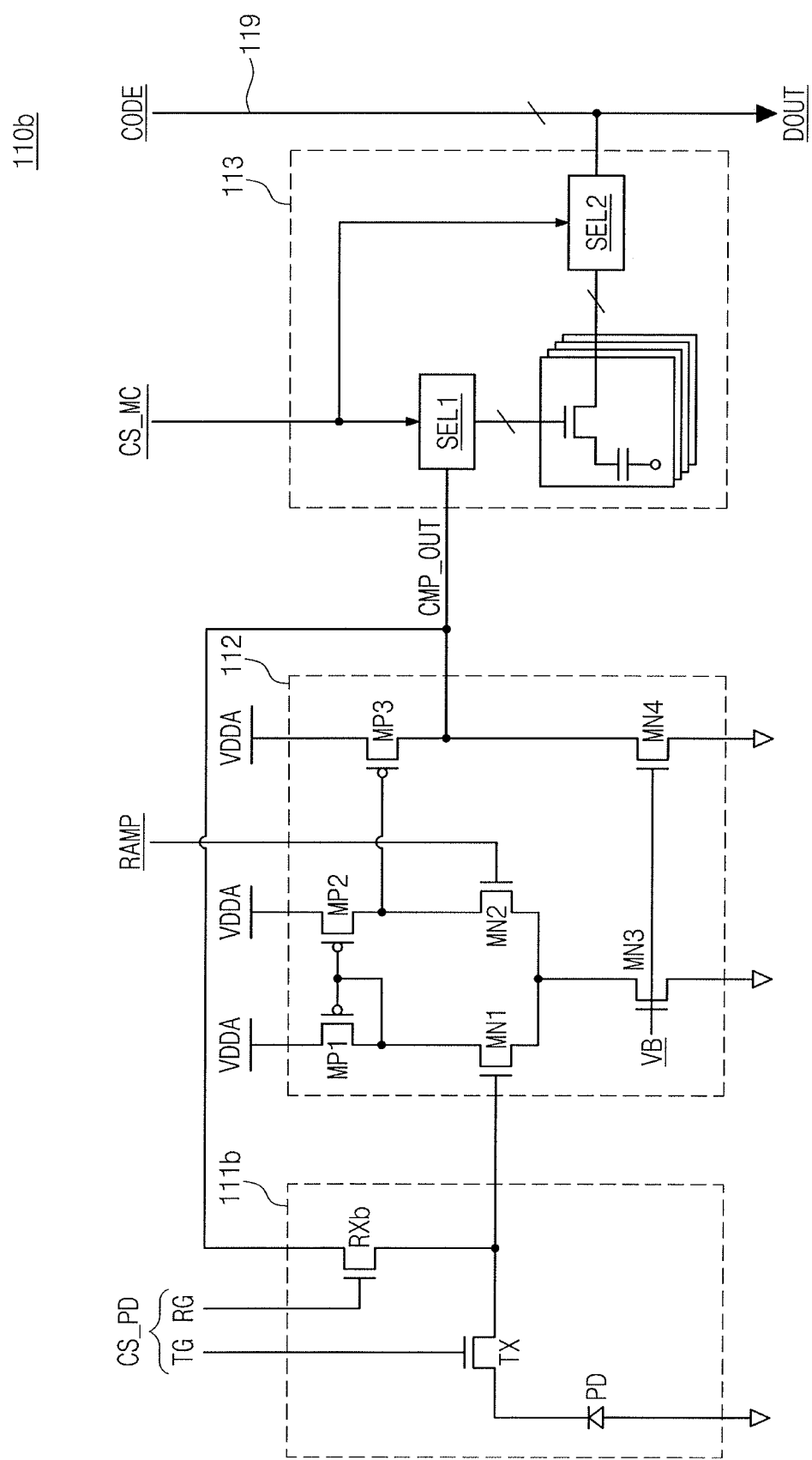

Referring to FIG. 7B, a reset transistor RXb of a photodetector 111b may reset the FD node with the comparison signal CMP_OUT instead of the power supply voltage VDDA. Operation of the digital pixel 110b may be similar to the operation of the digital pixel 110 except for a connection structure of the reset transistor RXb.

Figure 7C:
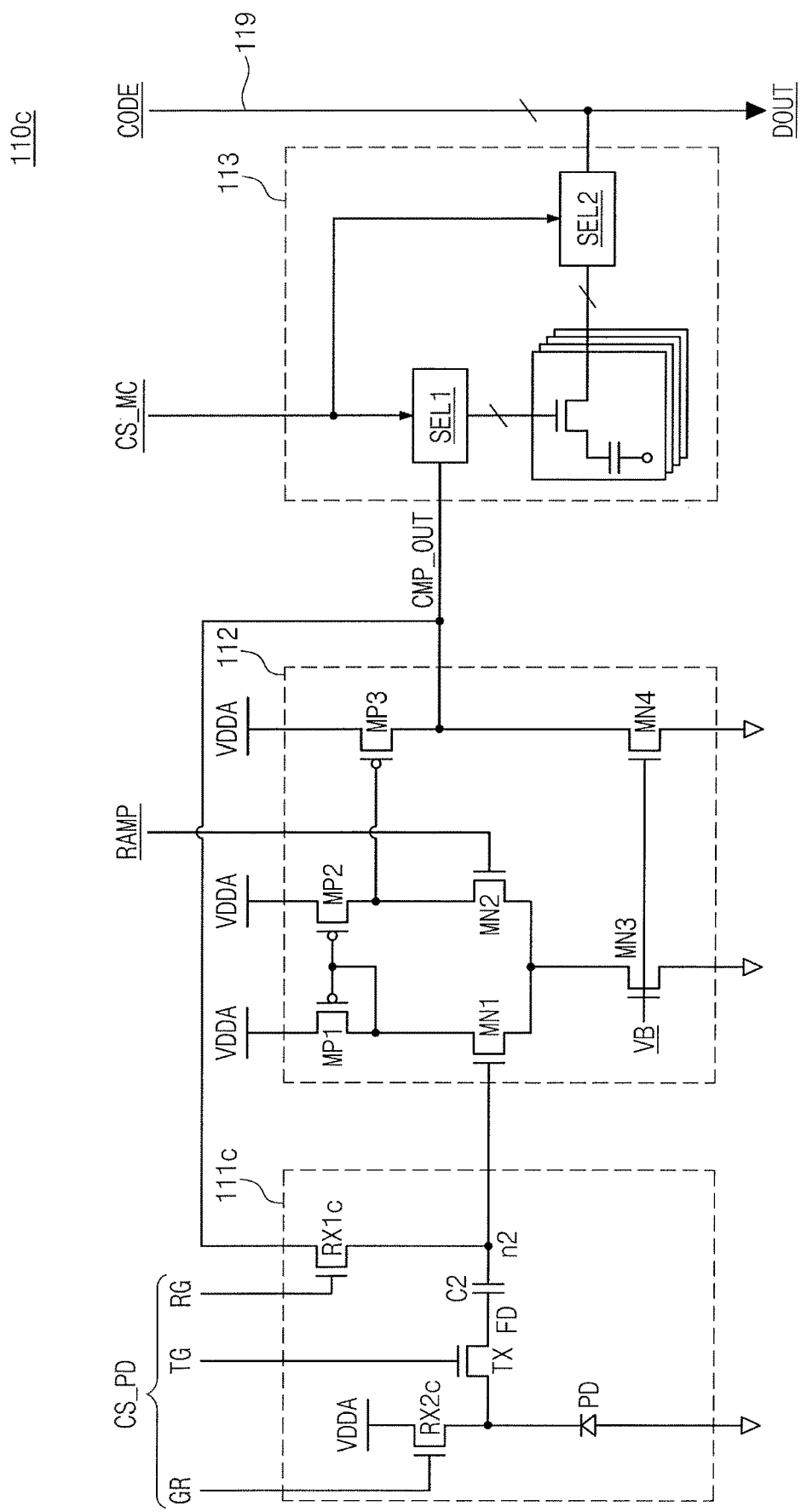

Referring to FIG. 7C, a photodetector 111c may include a second capacitor C2 connected between the FD node and a second node n2. The second capacitor C2 may be a passive element, a metal oxide semiconductor (MOS) transistor, a metal insulator metal (MIM) capacitor, a cell capacitor (being the same as C1), etc. The second capacitor C2 may be used to cancel an offset voltage due to mismatch of the comparator 112, a difference between threshold voltages of transistors, a geometry difference of the comparator 112, etc. A reset transistor RX1c of the photodetector 111c may short an output terminal (i.e., the comparison signal CMP_OUT) of the comparator 112 to an input terminal (i.e., the second node n2) of the comparator 112 in response to the reset signal RG. In this case, charges corresponding to the offset voltage of the comparator 112 may be stored in the second capacitor C2. Because the detection signal DET in which a voltage of the capacitor C2 is added to a voltage of the FD node is input to the comparator 112, the offset voltage of the comparator 112 may be canceled or removed.

The photodetector 111c may further include a reset transistor RX2c connected between the power supply voltage VDDA and the photoelectric conversion element PD. The reset transistor RX2c may reset the photoelectric conversion element PD to the power supply voltage VDDA in response to a global reset signal GR.

Figure 7D:
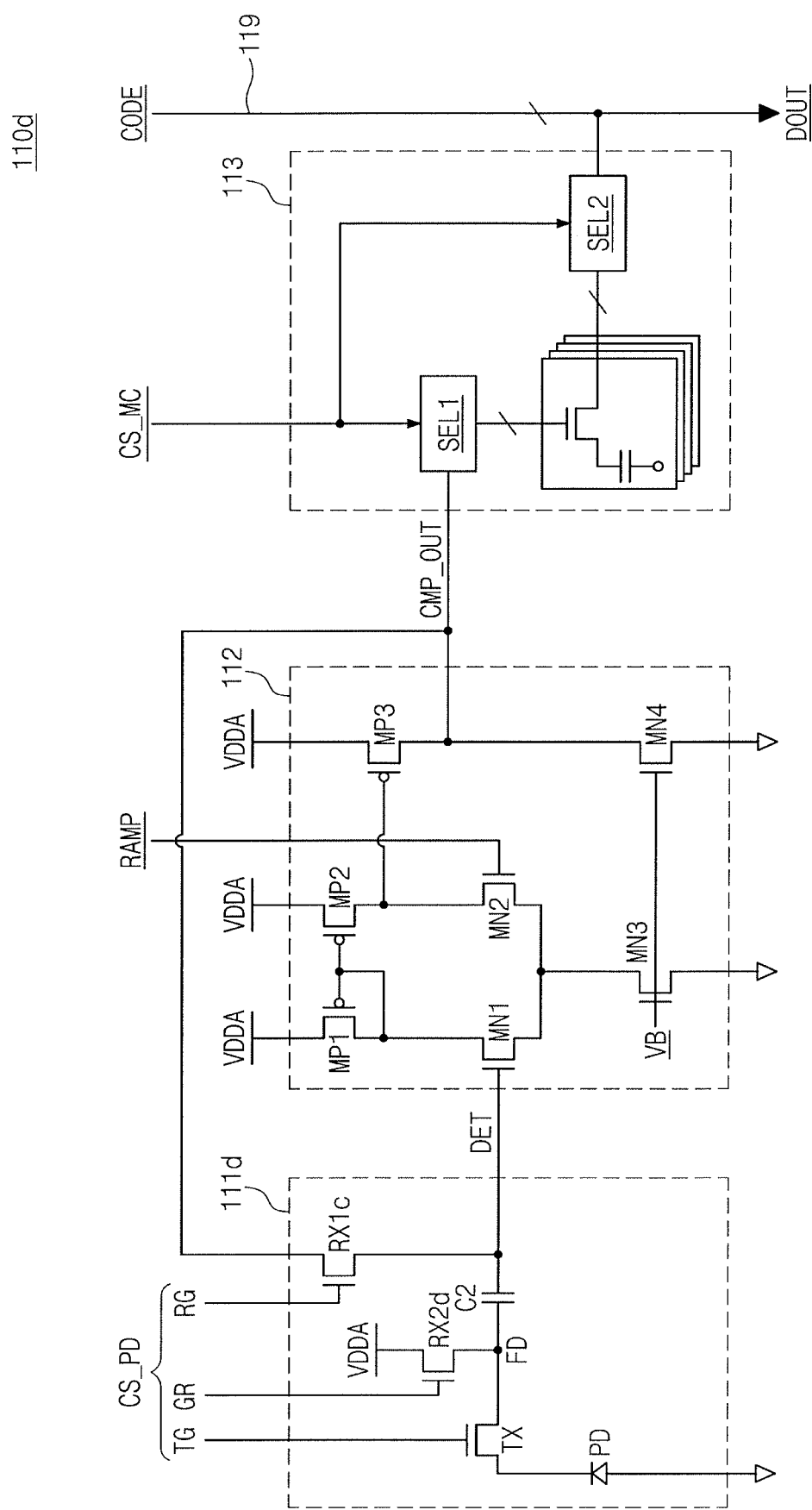

Referring to FIG. 7D, a reset transistor RX2d of the photodetector 111d may be connected between the power supply voltage VDDA and the FD node and may operate in response to the global reset signal GR. The remaining components and operations thereof are similar to the components and operations described above, and thus, additional description will be omitted to avoid redundancy.

The digital pixel 110 may have various shapes depending on a way to operate, a way to implement, etc., and may output the output data DOUT corresponding to a light signal detected at a pixel level. Because the influence of noise or coupling is reduced in comparison with an analog pixel, the digital pixel 110 may process a high-resolution image more accurately.

Figure 8:
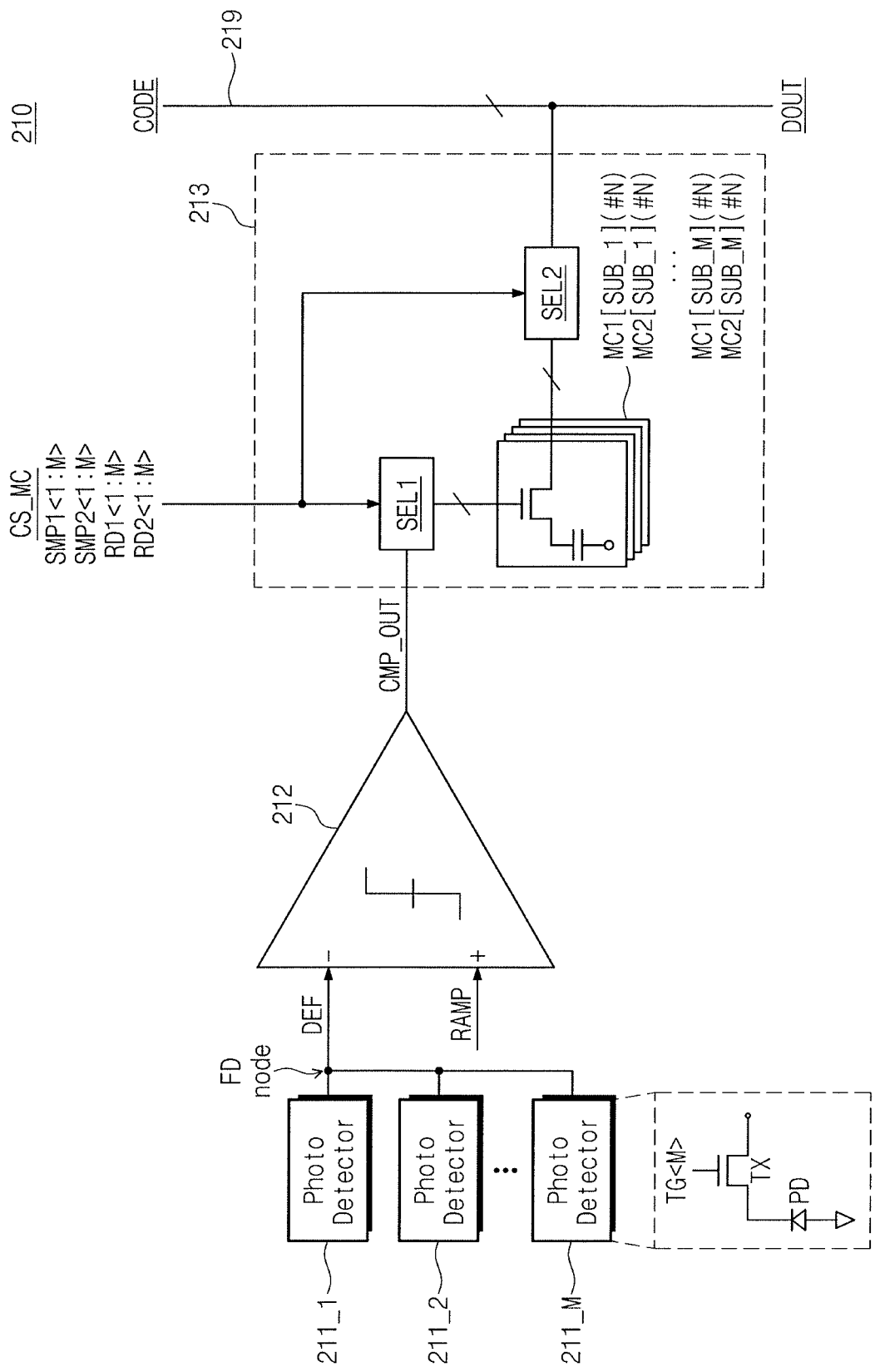
FIG. 8 illustrates a digital pixel of FIG. 1 according to another embodiment.

FIG. 8 illustrates a digital pixel of FIG. 1 according to another embodiment. A description will be focused on a difference between the digital pixel 110 and a digital pixel 210. The digital pixel 210 may include "M" photodetectors 211_1 to 211_M which share one FD node and one comparator 212 and are "M" sub pixels, the comparator 212, and a memory circuit 213. The memory circuit 213 may include memory cells MC1[SUB_1] to MC1[SUB_M] and MC2[SUB_1] to MC2[SUB_M], the selection circuit SEL1, and the selection circuit SEL2. "M" is a natural number of 2 or more and is independent of "N".

Operation of each of the photodetectors 211_1 to 211_M may be similar to that of the photodetector 111 described above. Because the digital pixel 210 includes the "M" photodetectors 211_1 to 211_M, the digital pixel 210 may include the memory cells MC1[SUB_1] to MC1[SUB_M] that store "M" reset counting values respectively corresponding to "M" reset levels of the detection signal DET determined by the photodetectors 211_1 to 211_M. As in the memory cells MC1, the number of the memory cells MC1[SUB_1] is "N", and the number of the memory cells MC1[SUB_M] is "N". The total number of the memory cells MC1[SUB_1] to MC1[SUB_M] may correspond to a value obtained by multiplying the number "M" of the photodetectors 211_1 to 211_M and the number "N" of bits of a reset counting value together. As in the above description, the digital pixel 210 may include the memory cells MC2[SUB_1] to MC2[SUB_M] that store "M" signal counting values respectively corresponding to "M" signal levels of the detection signal DET determined by the photodetectors 211_1 to 211_M. As in the memory cells MC2, the number of the memory cells MC2[SUB_1] is "N" and the number of the memory cells MC2[SUB_M] is "N". The total number of the memory cells MC2[SUB_1] to MC2[SUB_M] may correspond to a value obtained by multiplying the number "M" of the photodetectors 211_1 to 211_M and the number "N" of bits of a signal counting value together. The total number of the memory cells MC1[SUB_1] to MC1[SUB_M] and MC2[SUB_1] to MC2[SUB_M] in the digital pixel 210 may be "2×M×N".

The comparator 212 may compare the detection signal DET based on the photodetector 211_1 with the ramp signal RAMP and may output the comparison signal CMP_OUT to the selection circuit SEL1. The comparator 212 may compare the detection signal DET based on the photodetector 211_M with the ramp signal RAMP and may output the comparison signal CMP_OUT to the selection circuit SELL. Transfer (transmission) signals TG<1:M> may be applied to the photodetectors 211_1 to 211_M, respectively or independently. A level of the detection signal DET may be determined by a photodetector(s) that is(are) selected by the transfer signals TG<1:M>.

Operation of the selection circuit SEL1 may be similar to that of the selection circuit SEL1 of the digital pixel 110. When a level of the comparison signal CMP_OUT is switched while a first sampling signal SMP1<1> is activated, the selection circuit SEL1 may select the memory cells MC1[SUB_1] and may not select the remaining memory cells. The first switch circuit 141 may electrically connect the counter CNT to a plurality of transmission lines 219 during a time when the first sampling signal SMP1<1> is activated. The memory cells MC1[SUB_1] may store, as a reset sampling value, a value of the code "CODE" at a time when a level of the comparison signal CMP_OUT is switched while the first sampling signal SMP1<1> is activated. As in the above description, reset sampling values of the remaining photodetectors 211_2 to 211_M may be respectively stored in the memory cells MC1[SUB_2] to MC1[SUB_M] based on first sampling signals SMP1<2:M>, the comparison signal CMP_OUT, the selection circuit SEL1, and the first switch circuit 141.

When a level of the comparison signal CMP_OUT is switched while the second sampling signal SMP2<1> is activated, the selection circuit SEL1 may select the memory cells MC2[SUB_1] and may not select the remaining memory cells. The first switch circuit 141 may electrically connect the counter CNT to the plurality of transmission lines 219 during a time when the second sampling signal SMP2<1> is activated. The memory cells MC2[SUB_1] may store, as a signal sampling value, a value of the code "CODE" at a time when a level of the comparison signal CMP_OUT is switched while the second sampling signal SMP2<1> is activated. As in the above description, signal sampling values of the remaining photodetectors 211_2 to 211_M may be respectively stored in the memory cells MC2[SUB_2] to MC2[SUB_M] based on second sampling signals SMP2<2:M>, the comparison signal CMP_OUT, the selection circuit SEL1, and the first switch circuit 141.

When a first read signal RD1<1> is activated, the selection circuit SEL1 may select the memory cells MC1[SUB_1] and may not select the remaining memory cells. When the first read signal RD1<1> is activated, the second switch circuit 142 may electrically connect the plurality of transmission lines 219 to the sense amplifier SA. The reset sampling value stored in the memory cells MC1[SUB_1] may be output to the sense amplifier SA. As in the above description, the reset sampling values stored in the remaining memory cells MC1[SUB_2] to MC1[SUB_M] may be output to the sense amplifier SA based on first read signals RD_1<2:M>, the selection circuit SEL1, and the second switch circuit 142.

When a second read signal RD2<1> is activated, the selection circuit SEL1 may select the memory cells MC2[SUB_1] and may not select the remaining memory cells.

When the first read signal RD2<1> is activated, the second switch circuit 142 may electrically connect the plurality of transmission lines 219 to the sense amplifier SA. The signal sampling value stored in the memory cells MC2[SUB_1] may be output to the sense amplifier SA. As in the above description, the signal sampling values stored in the remaining memory cells MC2[SUB_2] to MC2[SUB_M] may be output to the sense amplifier SA based on second read signals RD2<2:M>, the selection circuit SEL1, and the second switch circuit 142.

As in the selection circuit SEL2 of the digital pixel 110, the selection circuit SEL2 may operate based on the control signals SMP_1<1:M>, SMP2<1:M>, RD_1<1:M>, and RD2<1:M>. When the first sampling signal SMP1<1> or the first read signal RD1<1> is activated, the selection circuit SEL2 may electrically connect the memory cells MC1 [SUB_1] to the plurality of transmission lines 219 and may electrically disconnect the remaining memory cells from the plurality of transmission lines 219. When the second sampling signal SMP2<1> or the second read signal RD2<1> is activated, the selection circuit SEL2 may electrically connect the memory cells MC2[SUB_1] to the plurality of transmission lines 219 and may electrically disconnect the remaining memory cells from the plurality of transmission lines 219. The selection circuit SEL2 may electrically connect the memory cells MC1[SUB_2] to MC1[SUB_M] and MC2[SUB_2] to MC2[SUB_M] to the plurality of transmission lines 219 using the control signals SMP1<2:M>, SMP2<2:M>, RD1<2:M>, and RD2<2:M>.

Figure 9A:
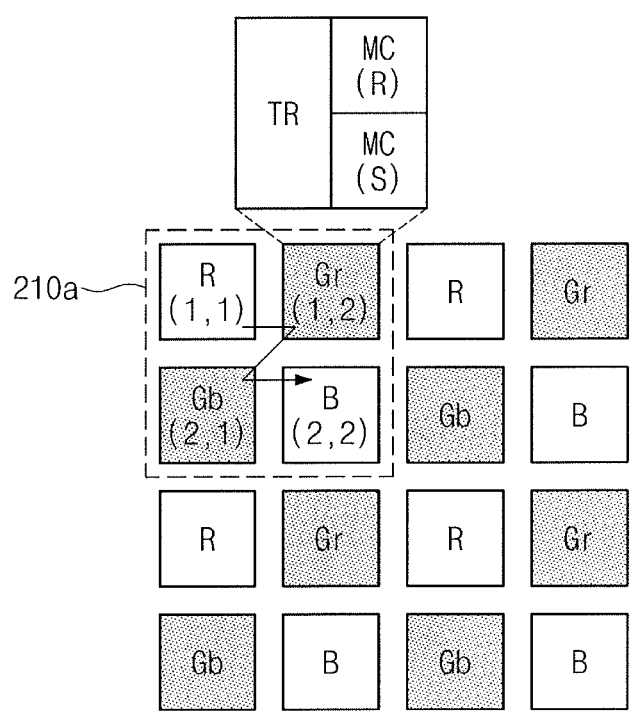
FIGS. 9A and 9B illustrate cases that digital pixels of FIG. 8 are repeatedly arranged along rows and columns.
Figure 9B:
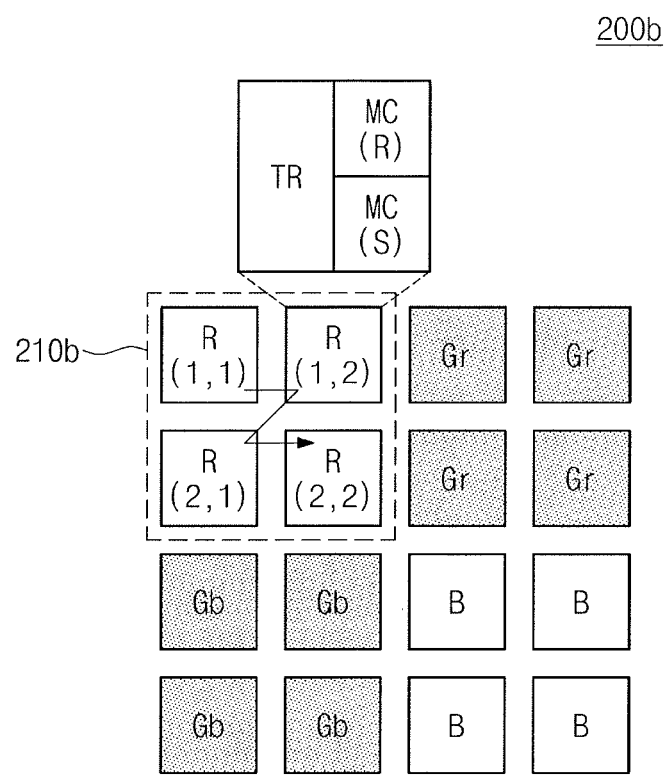

FIGS. 9A and 9B illustrate cases that digital pixels of FIG. 8 are repeatedly arranged along rows and columns. The number of pixels arranged along a row or column and the number of subpixels in one pixel are not limited to the example of FIGS. 9A and 9B.

An area of a subpixel may be divided into a transistor area TR, a reset memory cell area MC(R), and a signal memory cell area MC(S). The placement (arrangement) of the areas TR(R) and TR(S) are not limited to the example of FIGS. 9A and 9B. Transistors of any one of the photodetectors 211_1 to 211_M, a part of transistors constituting the comparator 212, and a part of transistors configuring the selection circuits SEL1 and SEL2 may be placed in the transistor area TR. From among the memory cells MC1[SUB_1] to MC1 [SUB_M], "N" memory cells which correspond to a photodetector placed in the transistor area TR may be placed in the reset memory cell area MC(R). From among the memory cells MC2[SUB_1] to MC2[SUB_M], "N" memory cells which correspond to the photodetector placed in the transistor area TR may be placed in the signal memory cell area MC(S).

Referring to a pixel array 200a of FIG. 9A, two digital pixels 210a are arranged along a row, and two digital pixels 210a are arranged along a column (a 2-by-2 array); in each digital pixel 210a, two subpixels are arranged along a row, and two subpixels are arranged along a column.

Subpixels of the digital pixel 210a may include color filters having three colors or four colors. Each of the subpixels may include one of blue (B), red (R), and green (Gb or Gr) color filters. In an implementation, subpixels R, B, Gb, and Gr may include color filters passing a magenta (Mg) light, a yellow (Y) light, a cyan (Cy) light, and/or a white (W) light. A portion of the subpixels R, B, Gb, and Gr may include an infrared filter Z that transmits infrared light. In one row, first color filters (e.g., red color filters R or blue color filters B) and second color filters (e.g., green color filters Gr or Gb) may be arranged alternatively. Each color filter may receive a light of a relevant color. The blue color filters B and the green color filters Gb may be arranged alternately in one row, and the red color filters R and the green color filters Gr may be arranged alternately in an adjacent row. The blue color filters B may be placed to be diagonal together with the red color filters R. The green color filters Gb and Gr associated with a luminance signal may be placed in all rows, and the red color filters R and the blue color filters B may be placed alternately for each row.

In one digital pixel 210a, reset sampling operations and signal sampling operations for respective subpixels may be performed in a predetermined order. Referring to FIG. 9A, the reset sampling operations may be performed in the order of subpixels placed at (1,1), (1,2), (2,1), and (2,2) coordinates in the digital pixel 210a. Next, the signals sampling operations may be performed in the order of subpixels placed at (1,1), (1,2), (2,1), and (2,2) coordinates in the digital pixel 210a. Sampling operations for subpixels in one digital pixel 210a may be performed in a local rolling shutter manner in the digital pixel 210a. Values of coordinates illustrated in FIG. 9A are relative and exemplary, and an arrow is also only exemplary. After the reset sampling operations and the signal sampling operations are performed, reset sampling values of subpixels may be output in the unit of a row and signal sampling values of the subpixels may be output in the unit of a row.

In FIG. 9A, each of the subpixels in one digital pixel 210a may include one of blue (B), red (R), and green (Gb or Gr) color filters. In contrast, referring to FIG. 9B, subpixels in one digital pixel 210b of a pixel array 200b may have the same color filter. Except for the placement of the color filter, sampling operations and read operations for subpixels in the digital pixel 210b of FIG. 9B may be similar to those associated with subpixels in the digital pixel 210a of FIG. 9A.

Figure 10:
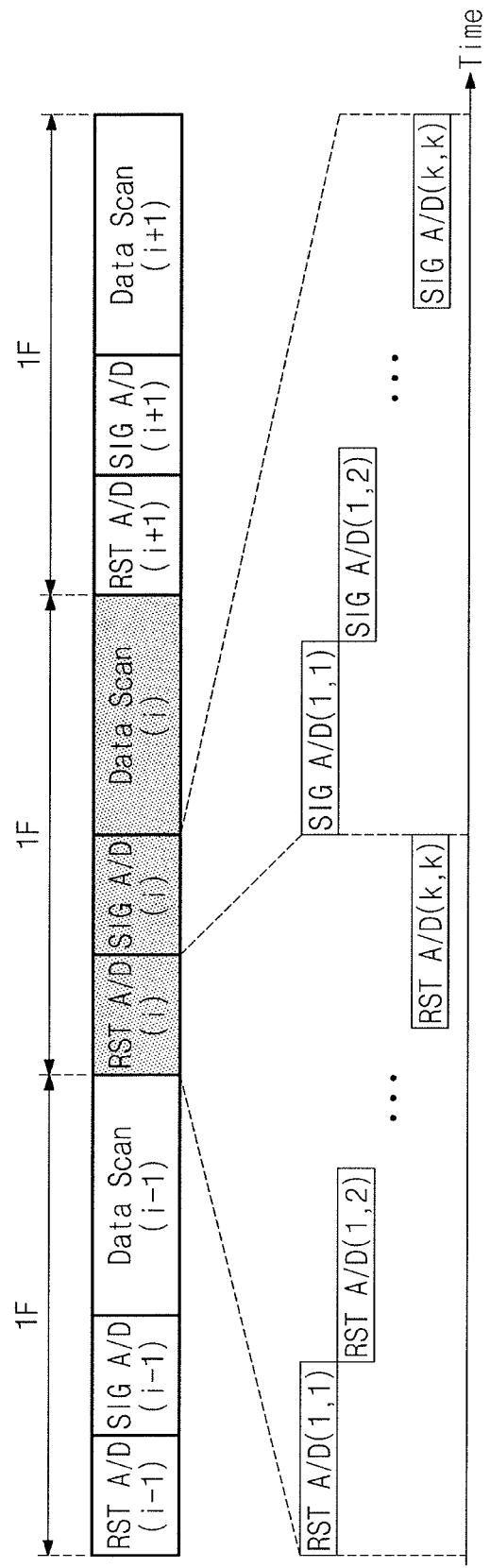
FIG. 10 illustrates a timing diagram of an operation of a digital pixel of FIG. 8.

FIG. 10 illustrates a timing diagram of an operation of a digital pixel of FIG. 8. A description will be focused on a difference between FIGS. 6 and 10. The 1F time may be divided into a time period RST A/D to reset the digital pixels 210 and convert reset levels of the digital pixels 210 into reset counting values, a time period SIG A/D to convert signal levels of the digital pixels 210 into signal counting values, and a time period Data Scan to read the reset counting values and the signal counting values stored in the digital pixels 210.

Resetting all the digital pixels 210 during the time period RST A/D may be performed simultaneously or sequentially (e.g., in the unit of a row). Storing the reset counting values of all the digital pixels 210 in memory cells (refer to MC1[SUB_1] to MC1[SUB_M]) may be performed simultaneously or sequentially (e.g., in the unit of a row). As illustrated in FIG. 10, resetting subpixels of the respective digital pixels 210 may be performed in the local rolling shutter manner. Storing reset counting values of subpixels of the respective digital pixels 210 in the memory cells MC1 [SUB_1] to MC1[SUB_M] may be performed in the local rolling shutter manner.

Storing the signal counting values of all the digital pixels 210 in memory cells (refer to MC2[SUB_1] to MC2 [SUB_M]) during the time period SIG A/D may be performed simultaneously or sequentially (e.g., in the unit of a row). Storing signal counting values of subpixels of the respective digital pixels 210 in the memory cells MC2 [SUB_1] to MC2[SUB_M] may be performed in the local rolling shutter manner.

During the time period Data Scan, the reset counting values stored in subpixels arranged along a row may be output (in parallel), and then the signal counting values stored in subpixels arranged along the row may be output (in parallel). The signal counting values may be output prior to the reset counting values. A read operation may be performed on other subpixels arranged along a next adjacent row.

Figure 11:
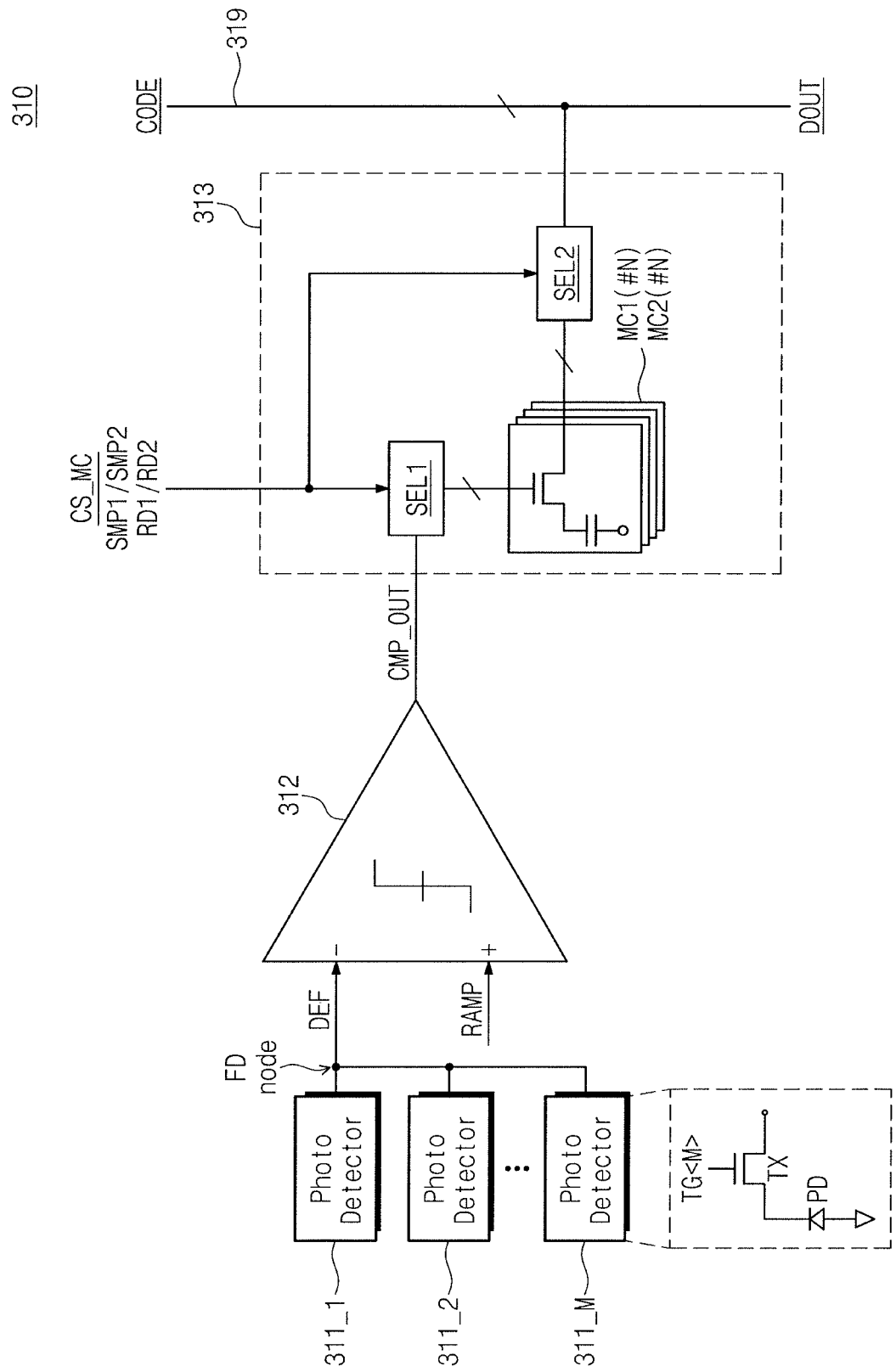
FIG. 11 illustrates a digital pixel of FIG. 1 according to another embodiment.

FIG. 11 illustrates a digital pixel of FIG. 1 according to another embodiment. A description will be focused on a difference between the digital pixels 110 and 210 and a digital pixel 310. The digital pixel 310 may include "M" photodetectors 311_1 to 311_M which share one FD node and one comparator 312 and are "M" sub pixels, the comparator 312, and a memory circuit 313. The memory circuit 313 may include the memory cells MC1 and MC2, the selection circuit SEL1, and the selection circuit SEL2. Here, "M" is a natural number of 2 or more. Subpixels in one digital pixel 310 may include the same color filter or different color filters as described with reference to FIGS. 9A and 9B.

In an embodiment, operations of the "M" photodetectors 311_1 to 311_M may be similar to the operations of the "M" photodetectors 211_1 to 211_M described above. In another embodiment, the "M" photodetectors 311_1 to 311_M may operate as one photodetector 111 described above (charge binning). The "M" photodetectors 311_1 to 311_M may be reset at the same time and may generate detection signals at the same time. Charges that accumulated by the photodetectors 311_1 to 311_M that are placed adjacent to each other may be accumulated or binned at one FD node. Because the "M" photodetectors 311_1 to 311_M operates simultaneously, a signal-to-noise ratio (SNR) may be improved. Components 312, 313, MC1, MC2, SEL1, and SEL2 of the digital pixel 310 may be similar to the components 112, 113, MC1, MC2, SEL1, and SEL2 of the digital pixel 110, except that the digital pixel 310 includes the "M" photodetectors 311_1 to 311_M.

The number "2×N" of the memory cells MC1 and MC2 included in the digital pixel 310 may be smaller than the number "2×M×N" of the memory cells MC1[SUB_1] to MC1[SUB_M] and MC2[SUB_1] to MC2[SUB_M] included in the digital pixel 210. In the case of the digital pixel 210, reset counting values and signal counting values may be stored in the memory cells MC1[SUB_1] to MC1[SUB_M] and MC2[SUB_1] to MC2[SUB_M], and then, the reset counting values and the signal counting values may be read from the memory cells MC1[SUB_1] to MC1[SUB_M] and MC2[SUB_1] to MC2[SUB_M].

In the case of the digital pixel 310, a reset counting value and a signal counting value of the photodetector 311_1 may be stored in the memory cells MC1 and MC2, and then, the reset counting value and the signal counting value of the photodetector 311_1 may be read from the memory cells MC1 and MC2. Similarly, a reset counting value and a signal counting value of the photodetector 311_M may be stored in the memory cells MC1 and MC2, and then, the reset counting value and the signal counting value of the photodetector 311_1 may be read from the memory cells MC1 and MC2. Because the number of the memory cells MC1 and MC2 included in the digital pixel 310 is the same as the number of memory cells included in the digital pixel 110, sampling of a reset counting value, sampling of a signal counting value, and data scan may be performed in the unit of a subpixel.

In an embodiment, when a part (e.g., memory cells MC1[SUB_2] to MC1[SUB_M] and MC2[SUB_2] to MC2[SUB_M]) of the memory cells MC1[SUB_1] to MC1[SUB_M] and MC2[SUB_1] to MC2[SUB_M] in the digital pixel 210 are deactivated, an operation of the digital pixel 210 may be similar to an operation of the digital pixel 30. Here, the example of the deactivated memory cells is not limited to the above description.

Figure 12A:
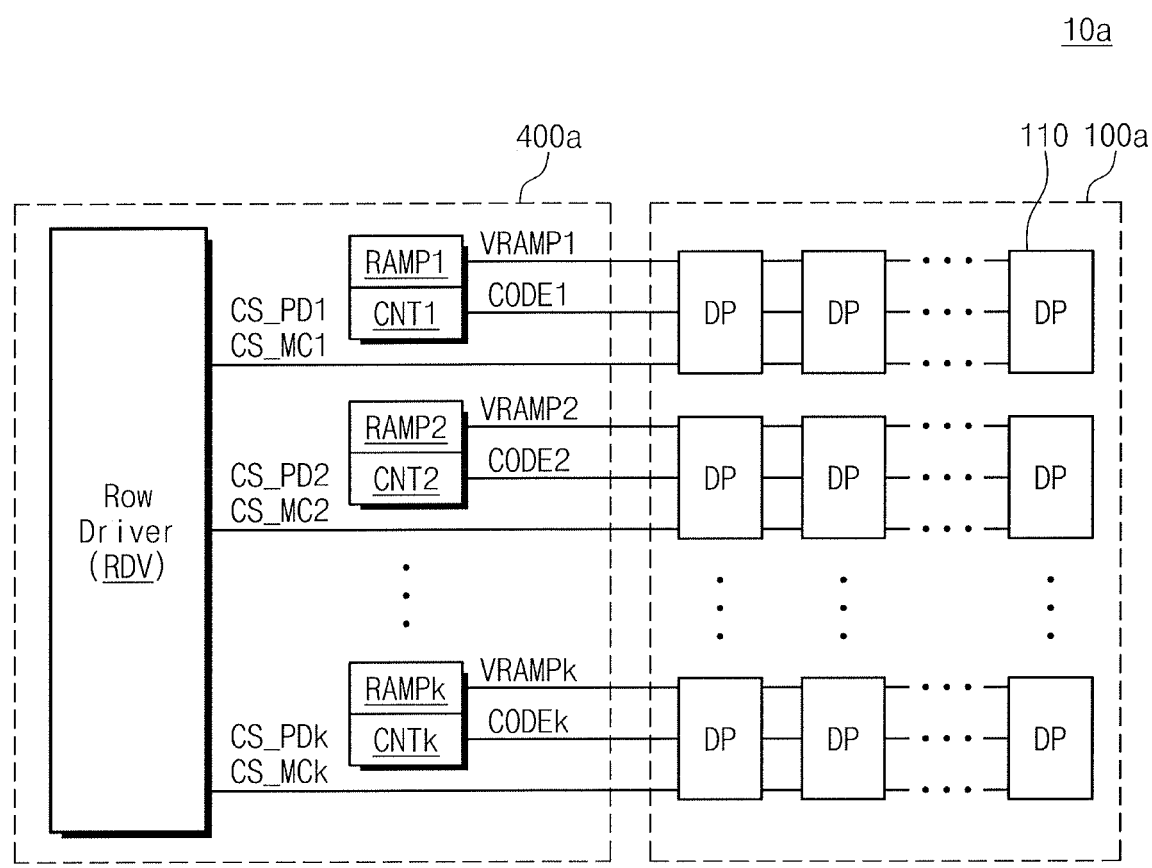
FIGS. 12A and 12B illustrate the image sensor of FIG. 1 in detail.
Figure 12B:
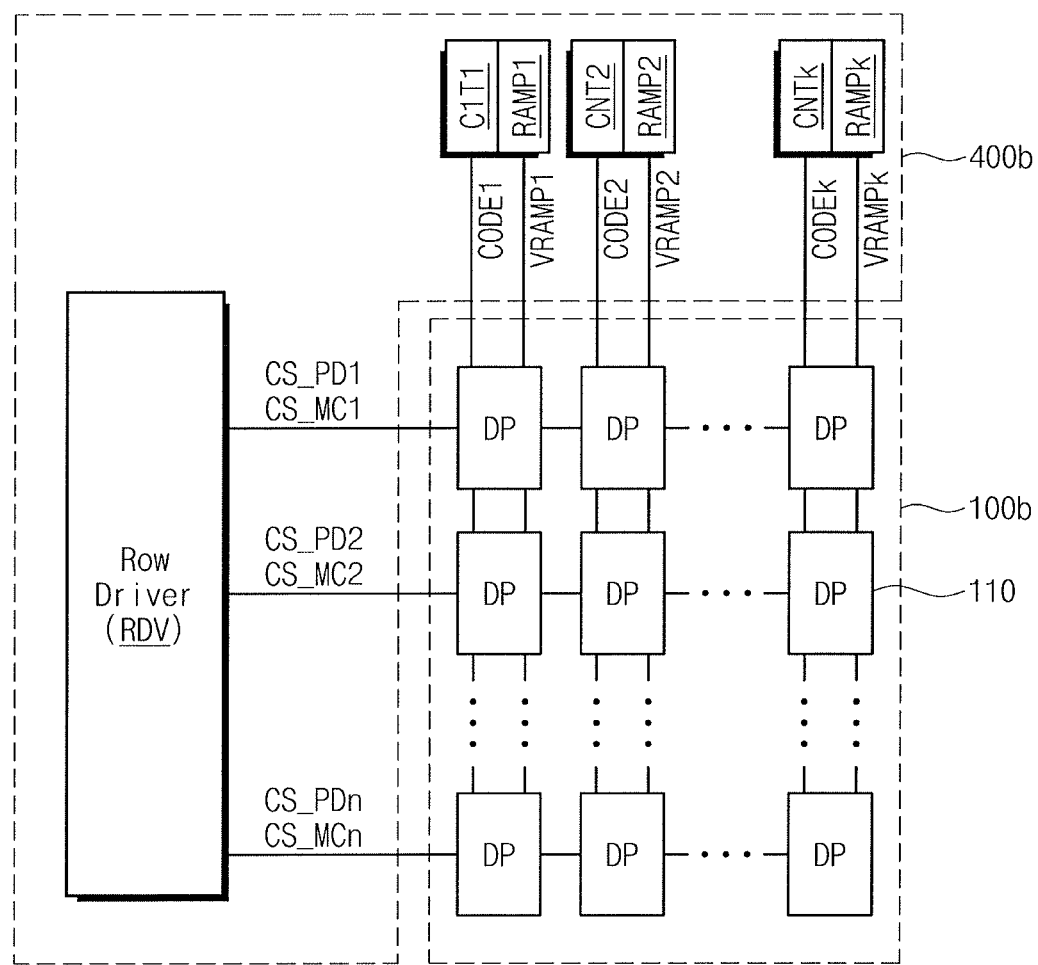

FIGS. 12A and 12B illustrate an image sensor of FIG. 1 in detail. A connection between a pixel driver 400a and the digital pixels of a pixel array 100a will be described with reference to FIG. 12A, and a connection between a pixel driver 400b and the digital pixels of a pixel array 100b will be described with reference to FIG. 12B.

Referring to FIG. 12A, the pixel driver 400a may include the row driver RDV, a plurality of ramp generators RAMP1 to RAMPk, and a plurality of counters CNT1 to CNTk. Here, "k" may be a natural number and is a number of rows. The row driver RDV may control the digital pixels 110 included in the pixel array 100a in the unit of a row. For example, the row driver RDV may respectively provide pixel control signals CS_PD1 to CS_PDk and memory control signals CS_MC1 to CS_MCk to the digital pixels 110 in the unit of a row. The digital pixels 110 may share a ramp signal and a code in the unit of a row. For example, the ramp generators RAMP1 to RAMPk may provide ramp signals VRAMP1 to VRAMPk to the digital pixels 110 in the unit of a row. The counters CNT1 to CNTk may provide codes CODE1 to CODEk to the digital pixels 110 in the unit of a row. Digital pixels in the same row may share the same ramp signal and the same code.

Referring to FIG. 12B, the pixel driver 400b may include the row driver RDV, the ramp generators RAMP1 to RAMPk, and the counters CNT1 to CNTk, where k is a number of columns. Unlike FIG. 12A, in FIG. 12B, the digital pixels 110 may share a ramp signal and a code in the unit of a column. The row driver RDV may respectively provide pixel control signals CS_PD1 to CS_PDn and memory control signals CS_MC1 to CS_MCn, where n is a number of rows, to the digital pixels 110 in the unit of a row. The image sensor 10b is similar to the image sensor 10a except that a ramp signal and a code are shared in the unit of a column.

Figure 13:
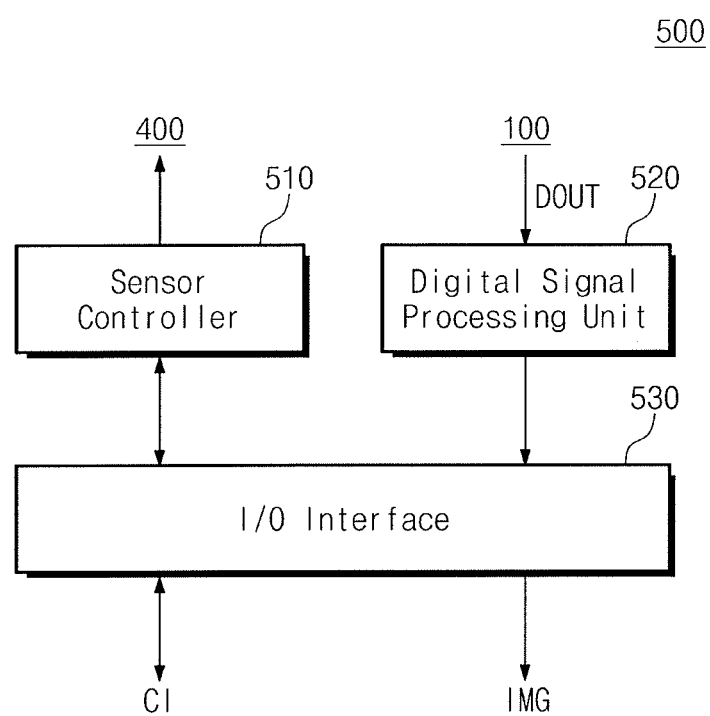
FIG. 13 illustrates a digital logic circuit of FIG. 1.

FIG. 13 illustrates a digital logic circuit of FIG. 1. The digital logic circuit 500 may include a sensor controller 510, a digital signal processing unit 520, and an input/output interface 530.

The sensor controller 510 may control overall operations of the image sensor 10 based on control information CI provided from an external device (e.g., an ISP or an AP) through the input/output interface 530. The sensor controller 510 may be a timing controller for controlling an operation timing of the pixel driver 400.

The digital signal processing unit 520 may receive output data DOUT from the pixel array 100 and may perform digital signal processing on the received output data DOUT. For example, one output data DOUT for one digital pixel 110 may include a reset sampling value "R" and a signal sampling value "S". The digital signal processing unit 520 may determine a final digital value corresponding to a light signal sensed by one digital pixel 110 by performing an operation (e.g., a correlated double sampling (CDS) operation; S-R) on the reset sampling value "R" and the signal sampling value "S". Final image data IMG may be generated by combining the final digital values of the respective digital pixels 110.

The input/output interface 530 may receive the control information CI from the external device (e.g., an ISP or an AP) or may output the final image data IMG. For example, the input/output interface 530 may include a physical layer for exchanging the above information based on a predefined protocol and supporting the protocol.

Figure 14:
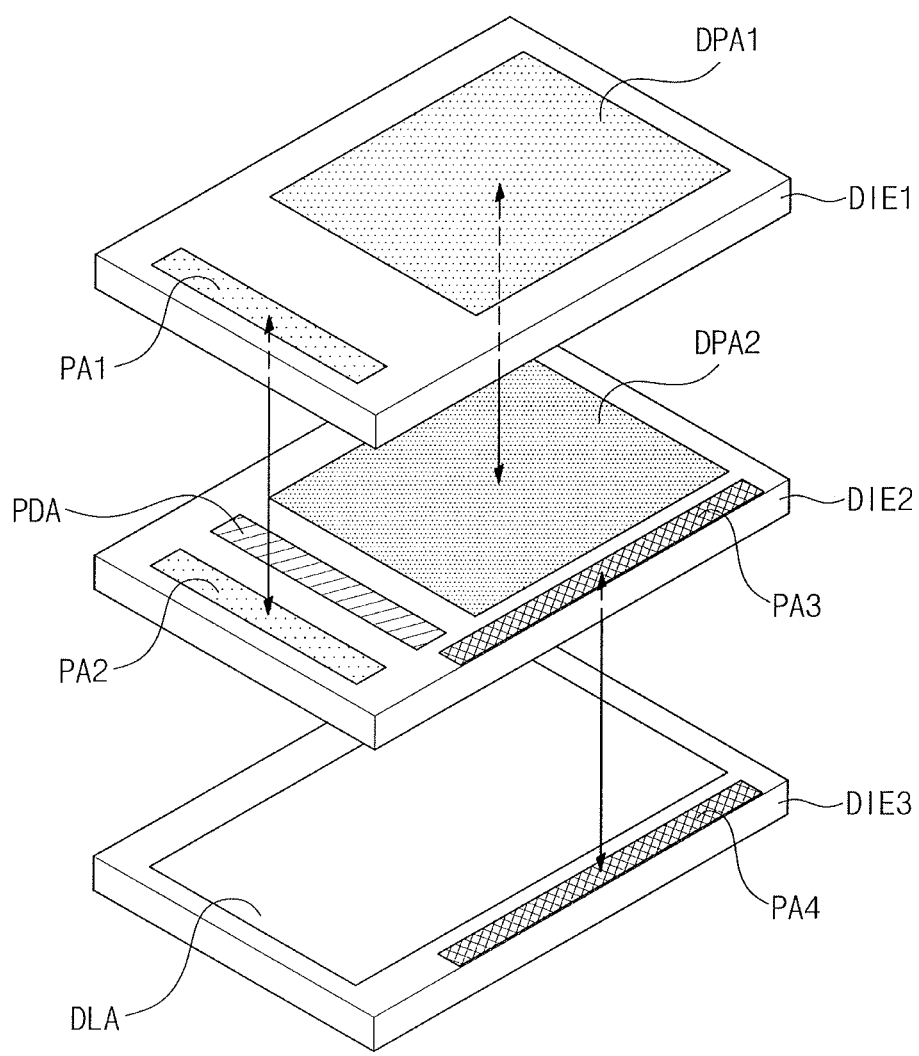
FIG. 14 illustrates a perspective view of an image sensor of FIG. 1.

FIG. 14 is a perspective view illustrating an image sensor of FIG. 1. The image sensor 10 will be described in terms of a physical structure. In detail, embodiments will be described with respect to semiconductor dies included in the image sensor 10. Components illustrated in the following drawings are simplified unlike a semiconductor wafer, a semiconductor chip, a semiconductor die, or a semiconductor package implemented in practice. For example, semiconductor dies DIE1 to DIE3 of the image sensor 10 may be manufactured through different semiconductor processes or from different semiconductor wafers.

The semiconductor die DIE1 may be stacked on the semiconductor die DIE2 and may be electrically connected to the semiconductor die DIE2. The semiconductor die DIE2 may be stacked on the semiconductor die DIE3 and may be electrically connected to the semiconductor die DIE3. The semiconductor die DIE2 may be interposed between the semiconductor dies DIE1 and DIE3. The semiconductor die DIE1 may include a digital pixel area DPA1 and a pad area PA1. The digital pixel area DPA1 and the pad area PA1 may be physically separated from each other or may be spaced from each other as much as a given distance.

A portion of each of the digital pixels 110 may be formed in the digital pixel area DPA1. The photodetector 111 and a portion of the comparator 112 of the digital pixel 110 may be formed in the digital pixel area DPA1 of the semiconductor die DIE1. A plurality of pads that are connected to a pad area PA2 of the semiconductor die DIE2 may be formed in the pad area PA1. The pad area PA1 may be connected to elements of the digital pixel area DPA1 through a metal layer formed in the semiconductor die DIE1.

The semiconductor die DIE2 may include a digital pixel area DPA2, the pad area PA2, a pixel driver area PDA, and a pad area PA3. Components, which are not formed in the digital pixel area DPA1 of the semiconductor die DIE1, from among components of the digital pixel 110, and the memory cells MC1 and MC2 or the memory circuit 113 of the digital pixel 110 may be formed in the digital pixel area DPA2.

A portion of the comparator 112 formed in the digital pixel area DPA1 of the semiconductor die DIE1 and the remaining portion of the comparator 112 formed in the digital pixel area DPA2 of the semiconductor die DIE2 may be bonded through a connection structure formed on a plane corresponding to the digital pixel area DPA1 or the digital pixel area DPA2. The connection structure may be Cu-to-Cu bonding, through silicon via (TSV), back via stack (BVS), etc.

The pixel driver 400 may be formed in the pixel driver area PDA. A plurality of pads that are connected to the pad area PA1 may be formed in the pad area PA2. The plurality of pads of the pad area PA2 may be respectively connected to the plurality of pads of the pad area PA1 through a connection structure, e.g., the pad area PA1 and the pad area PA2 may overlap each other along a stacking direction. The connection structure may be Cu-to-Cu bonding, TSV, BVS, etc. A plurality of pads that are connected to the semiconductor pad DIES may be formed in the pad area PA3. Various elements included in the digital pixel area DPA2, the pad area PA2, the pixel driver area PDA, and the pad area PA3 may be connected to each other through a metal layer of the semiconductor die DIE2.

The semiconductor die DIE3 may include a digital logic circuit area DLA and a pad area PA4. The digital logic circuit 500 may be formed in the digital logic circuit area DLA. A plurality of pads may be formed in the pad area PA4. The plurality of pads of the pad area PA4 may be respectively connected to the plurality of pads of the pad area PA3 through a connection structure, e.g., the pad area PA3 and the pad area PA4 may overlap each other along a stacking direction. The connection structure may be Cu-to-Cu bonding, TSV, BVS, etc.

The digital pixel area DPA1 of the semiconductor die DIE1 and the digital pixel area DPA2 of the semiconductor die DIE2 may overlap each other in the same plane area, e.g., along a stacking direction. As a peripheral circuit area, the remaining areas of the semiconductor dies DIE1 and DIE2 other than the digital pixel areas DPA1 and DPA2 may be an area for forming a connection structure between semiconductor dies, a driver circuit, an analog circuit, etc. Circuits or physical components that operate based on a digital signal in the image sensor 10 may be formed in the semiconductor die DIE3.

The image sensor 10 according to an embodiment may be implemented using the semiconductor dies DIE1 to DIE3. The area of a pixel core area for forming the plurality of digital pixels 110 may be reduced by separately or partially forming elements of the digital pixel in the semiconductor dies DIE1 and DIE2. Because the circuits that are based on the digital signal are formed in the semiconductor die DIE3, an analog-based circuit and a digital-based circuit may be classified (separated) in the unit of a semiconductor die.

Figure 15:
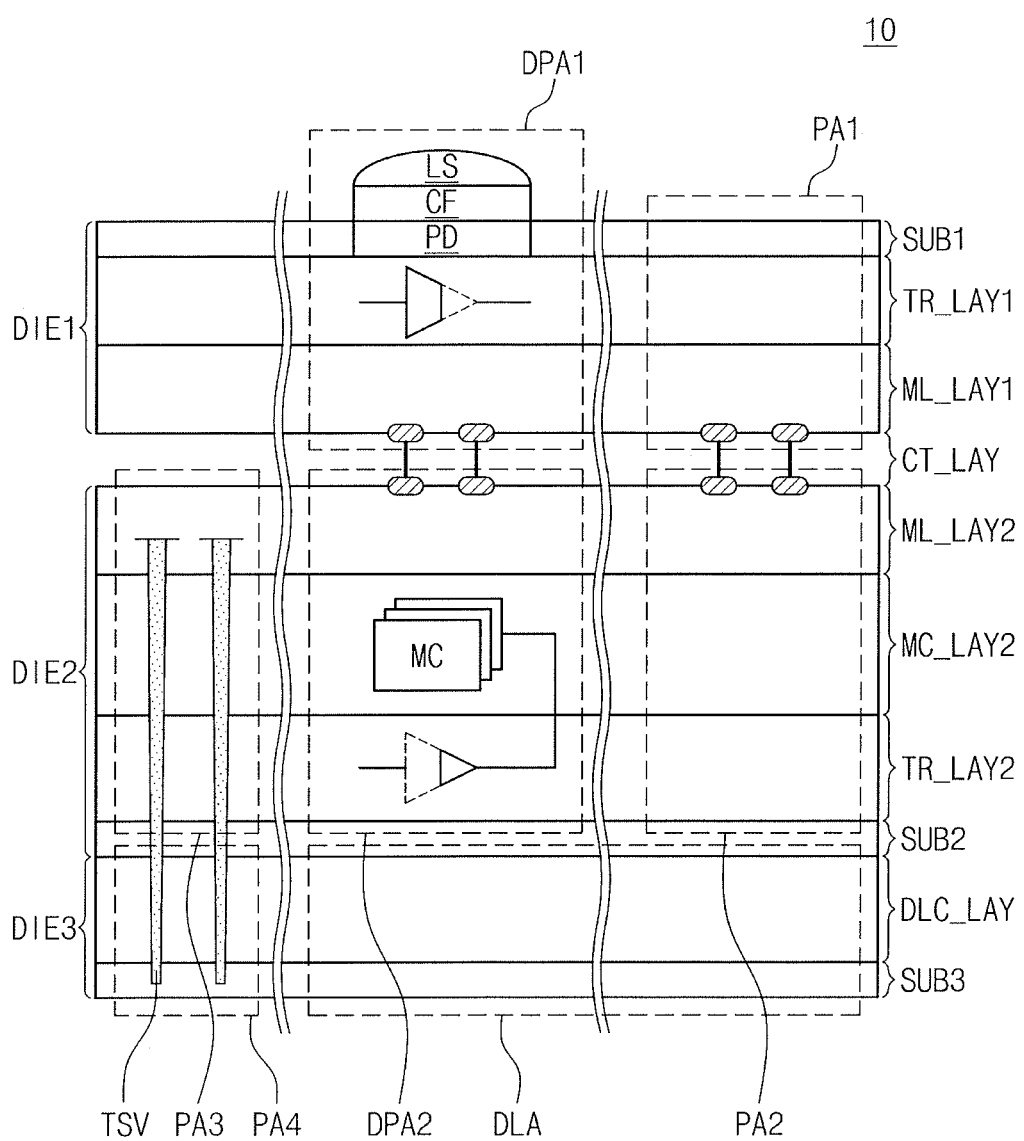
FIG. 15 illustrates a cross-sectional view of an image sensor according to an embodiment of FIG. 14.

FIG. 15 is a cross-sectional view illustrating an image sensor according to an embodiment of FIG. 14. For convenience, a description will be given with respect to the digital pixel 110 of FIG. 3.

The semiconductor die DIE1 may include a substrate SUB1. For example, the photodiode PD may be formed in the substrate SUB1, and a color filter CF and a lens LS may be formed on the photodiode PD. A transistor layer TR_LAY1 may be formed under the substrate SUB1. The transfer transistor TX and the reset transistor RX of the photodetector 111 and a portion of the comparator 112 (i.e., a part of transistors in the comparator 112) may be formed in the transistor layer TR_LAY1. The photodiode PD, the color filter CF, the lens LS, the transfer transistor TX, the reset transistor RX, and the portion of the comparator 112 may be formed in the digital pixel area DPA1. A metal layer ML_LAY1 may be formed under the transistor layer TR_LAY1.

The semiconductor die DIE2 may include a substrate SUB2. For example, the semiconductor die DIE2 may include the remaining portion of the comparator 112 and the memory circuit 113. A transistor layer TR_LAY2 including the remaining portion of the comparator 112 may be formed on the substrate SUB2. A memory circuit layer MC_LAY may be formed on the transistor layer TR_LAY2. The plurality of memory cells MC1 and MC2 of the memory circuit 113 may be stacked to overlap the digital pixel 110 in a plan view, e.g., along a stacking direction. Transistors of the memory cells MC1 and MC2 may include IGZO (Indium Gallium Zinc Oxide) and may be also referred to as an "IGZO (thin film) transistor". A metal layer ML_LAY2 may be formed on the memory circuit layer MC_LAY. Metal lines for connecting a plurality of elements included in the semiconductor die DIE2 may be formed in the metal layer ML_LAY2.

The selection circuits SEL1 and SEL2 included in the memory circuit 113 may be formed in any one of the memory circuit layer MC_LAY and the transistor layer TR_LAY2. Alternatively, the selection circuits SEL1 and SEL2 may be formed in the pixel driver area PDA of the semiconductor die DIE2 and may be connected to the memory circuit 113 through the metal lines of the metal layer ML_LAY2. The plurality of memory cells MC1 and MC2 included in the memory circuit 113 may be formed in the digital pixel area DPA2 of the memory circuit layer MC_LAY, and the remaining portion of the comparator 112 may be formed in the digital pixel area DPA2 of the transistor layer TR_LAY2. The transistor layer TR_LAY2 and the memory circuit layer MC_LAY of the semiconductor die DIE2 are illustrated to be separated from each other, but the remaining portion of the comparator 112 and the memory circuit 113 may be formed in the same layer.

The semiconductor die DIE3 may include a substrate SUB3. A digital logic circuit layer DLC_LAY including the digital logic circuit 500 may be formed on the substrate SUB3. The semiconductor die DIE3 may further include an additional metal layer that includes a plurality of metal lines to connect a plurality of elements included in the digital logic circuit 500.

The metal layer ML_LAY1 of the semiconductor die DIE1 and the metal layer ML_LAY2 of the semiconductor die DIE2 may be bonded through a connection layer CT_LAY so as to face each other or so as to overlap each other. The metal line included in the metal layer ML_LAY1 of the digital pixel area DPA1 and the metal line included in the metal layer ML_LAY2 of the digital pixel area DPA2 may be connected to each other through a connection structure (e.g., the Cu-to-Cu bonding). The above metal lines may be connected to an element in the portion of the comparator 112 and an element in the remaining portion of the comparator 112. The portion of the comparator 112 included in the semiconductor die DIE1 and the remaining portion of the comparator 112 included in the semiconductor die DIE2 may be connected to each other through a connection structure belonging to the digital pixel areas DPA1 and DPA2.

The metal line included in the metal layer ML_LAY1 of the pad area PA1 and the metal line included in the metal layer ML_LAY2 of the pad area PA2 may be connected to each other through a connection structure (e.g., the Cu-to-Cu bonding). The semiconductor die DIE2 and the semiconductor die DIE3 may be connected to each other through the TSV. The TSV may be formed to pass (penetrate) through the semiconductor die DIE2 from the metal layer ML_LAY2 of the semiconductor die DIE2, and the metal layer ML_LAY2 and the semiconductor substrate SUB3 (or a separate metal layer) of the semiconductor die DIE3 may be connected to each other through the TSV.

Figure 16:
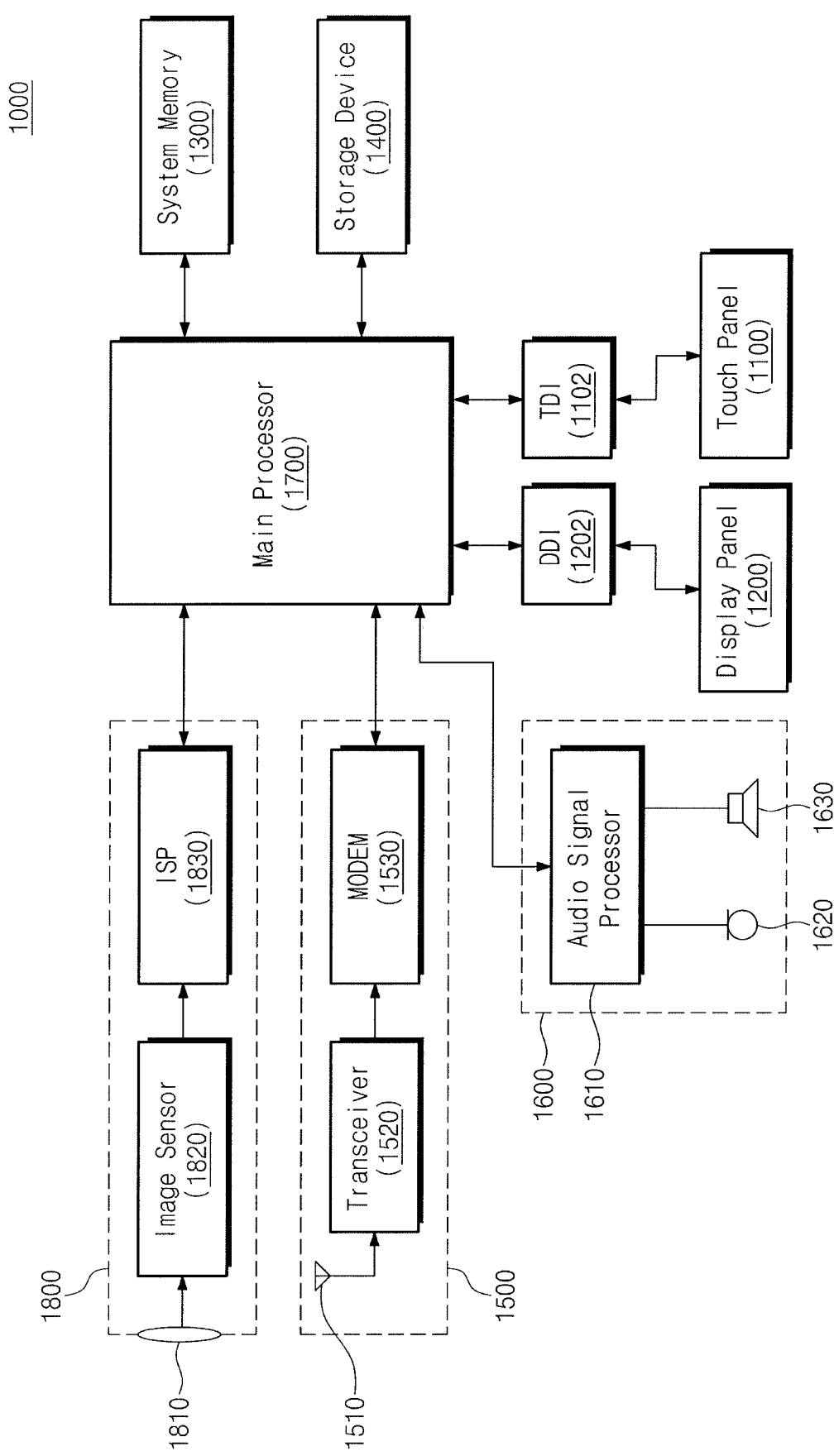
FIG. 16 illustrates an electronic device including an image sensor according to embodiments.

FIG. 16 illustrates an electronic device that includes an image sensor according to embodiments. An electronic device 1000 may be one of various electronic devices such as a portable communication terminal, a personal digital assistant (PDA), a portable media player (PMP), a digital camera, a smartphone, a tablet computer, a laptop computer, a wearable device, and the like.

A touch driver integrated (TDI) circuit 1102 may control a touch panel 1100. The touch panel 1100 may sense a touch input from a user under control of the TDI circuit 1102. A display driver integrated (DDI) circuit 1202 may drive a display panel 1200. The display panel 1200 may display image information under control of the DDI circuit 1202. A system memory 1300 may store data that are used for an operation of the electronic device 1000. The system memory 1300 may include a volatile memory or a nonvolatile memory. A storage device 1400 may store data regardless of whether a power is supplied. The storage device 1400 may include a nonvolatile memory. The storage device 1400 may include an embedded memory and/or a removable memory. A communication block 1500 may exchange signals with an external device/system through an antenna 1510. A transceiver 1520 and a MODEM (Modulator/Demodulator) 1530 of the communication block 1500 may process signals, which are exchanged with the external device/system, in compliance with one a wireless communication protocol. An audio processor 1600 may process an audio signal by using an audio signal processor 1610. The audio processor 1600 may receive an audio input through a microphone 1620 or may provide an audio output through a speaker 1630. A main processor 1700 may control/manage operations of components of the electronic device 1000. A part of the components of FIG. 16 may be implemented in the form of a system on chip and may be an application processor (AP). An image processor 1800 may receive a light through a lens 1810. An image sensor 1820 and an ISP 1830 included in the image processor 1800 may generate image information about an external object, based on the received light. The image processor 1800 or the image sensor 1820 may be an image sensor described with reference to FIGS. 1 to 15.

By way of summation and review, a general image sensor operates based on analog pixels. Analog signals are output from the analog pixels depending on an incident light and the analog signals are converted into image data. However, the analog signals are vulnerable to noise or coupling as compared with digital signals.

An image sensor according to an embodiment may use a digital pixel having in pixel storage, thus reducing the area necessary per unit pixel and power consumption in processing image data.

What is claimed is:

1. An image sensor, comprising:
   a plurality of pixels, each of the plurality of pixels including:
   a photodetector including a photoelectric conversion element that outputs a detection signal in response to light incident thereon;
   a comparator that compares the detection signal of the photodetector with a ramp signal and to output a comparison signal in response thereto;
   a plurality of first memory cells that store a first counting value corresponding to a first voltage level of the detection signal using the comparison signal of the comparator and to output the first counting value through a plurality of transmission lines; and
   a plurality of second memory cells that store a second counting value corresponding to a second voltage level of the detection signal using the comparison signal of the comparator and to output the second counting value through the plurality of transmission lines,
   wherein a number of the plurality of first memory cells is the same as a number of the plurality of second memory cells, and the number of the plurality of first memory cells is the same as a number of the plurality of transmission lines.

2. The image sensor as claimed in claim 1, further comprising:
   a selection circuit that:
   selects the plurality of first memory cells so that the first counting value transferred through the plurality of transmission lines is stored in the plurality of first memory cells; and
   selects the plurality of second memory cells so that the second counting value transferred through the plurality of transmission lines is stored in the plurality of second memory cells.

3. The image sensor as claimed in claim 1, further comprising:
   a selection circuit that:

selects the plurality of first memory cells so that the first counting value stored in the plurality of first memory cells is output to the plurality of transmission lines; and selects the plurality of second memory cells so that the second counting value stored in the plurality of second memory cells is output to the plurality of transmission lines.

4. The image sensor as claimed in claim 1, wherein corresponding first and second memory cells overlap each of the plurality of pixels in a plan view.

5. The image sensor as claimed in claim 1, further comprising:
a capacitor connected between a floating diffusion (FD) node at which the detection signal is generated and an input terminal of the comparator to which the detection signal is input.

6. The image sensor as claimed in claim 1, further comprising:
a counter to output a counting value through the plurality of transmission lines, wherein
the counting value is the first counting value when the ramp signal reaches the first voltage level of the detection signal, and
the counting value is the second counting value when the ramp signal reaches the second voltage level of the detection signal.

7. The image sensor as claimed in claim 6, further comprising:
a switch circuit to:
electrically connect the counter to the plurality of transmission lines to store the first and second counting values in the plurality of first and second memory cells; and
electrically disconnect the counter from the plurality of transmission lines so that the first and second counting values are output from the plurality of first and second memory cells.

8. The image sensor as claimed in claim 1, further comprising:
a sense amplifier to sense the first and second counting values through the plurality of transmission lines, respectively; and
a switch circuit to electrically connect the plurality of transmission lines to the sense amplifier so that the first and second counting values are output to the sense amplifier.

9. The image sensor as claimed in claim 1, wherein each of the plurality of first and second memory cells is a dynamic random access memory (DRAM) cell having one transistor and one capacitor.

10. An image sensor, comprising:
a plurality of pixels,
wherein each of the plurality of pixels includes:
first to M-th subpixels respectively connected to a floating diffusion (FD) node, wherein M is a natural number of 2 or more, each of the first to M-th subpixels outputting a detection signal in response to light incident thereon;
a comparator that compares a ramp signal with the detection signal generated at the FD node by one of the first to M-th subpixels and to output a comparison signal in response thereto;
a plurality of first memory cells that store first to M-th reset counting values respectively corresponding to first to M-th reset levels of the detection signal that are respectively determined by the first to M-th subpixels, using the comparison signal of the comparator; and
a plurality of second memory cells to store first to M-th signal counting values respectively corresponding to first to M-th signal levels of the detection signal that are respectively determined by the first to M-th subpixels, using the comparison signal of the comparator,
wherein:
a number of the plurality of first memory cells corresponds to a value obtained by multiplying the number of subpixels "M" and "N", wherein N is a number of bits of each of the first to M-th reset counting values, and
a number of the plurality of second memory cells corresponds to a value obtained by multiplying the number of subpixels "M" and the "N", wherein N is a number of the bits of each of the first to M-th signal counting values.

11. The image sensor as claimed in claim 10, wherein the detection signal is generated at the FD node in a predetermined order from among the first to M-th subpixels.

12. The image sensor as claimed in claim 10, wherein:
each of the first to M-th reset counting values is stored in first memory cells selected in a predetermined order from among the plurality of first memory cells, and
each of the first to M-th signal counting values is stored in second memory cells selected in a predetermined order from among the plurality of second memory cells.

13. The image sensor as claimed in claim 10, wherein:
the first to M-th reset counting values are transferred to the plurality of first memory cells through a plurality of transmission lines,
the first to M-th signal counting values are transferred to the plurality of second memory cells through the plurality of transmission lines, and
a number of the plurality of transmission lines corresponds to a number of bits of each of the first to M-th reset counting values and the first to M-th signal counting values.

14. The image sensor as claimed in claim 10, wherein a color filter in one subpixel of the first to M-th subpixels is different from a color filter in another subpixel of the first to M-th subpixels.

15. An image sensor, comprising:
a plurality of pixels, each of the plurality of pixels including:
first to M-th subpixels which are respectively connected to a floating diffusion (FD) node, wherein M is a natural number of 2 or more, each of the first to M-th subpixels outputting a detection signal in response to light incident thereon;
a comparator that compares a ramp signal with detection signals generated at the FD node by all of the first to M-th subpixels and to output a comparison signal in response thereto;
a plurality of first memory cells that store a first counting value corresponding to a first voltage level of the detection signal using the comparison signal of the comparator, and to output the first counting value through a plurality of transmission lines; and
a plurality of second memory cells that store a second counting value corresponding to a second voltage level of the detection signal using the comparison signal of the comparator, and to output the second counting value through the plurality of transmission lines,
wherein a number of the plurality of first memory cells is the same as a number of the plurality of second memory cells, and the number of the plurality of first memory cells is the same as a number of the plurality of transmission lines.

16. The image sensor as claimed in claim 15, wherein:
a number of the plurality of first memory cells corresponds to a number of bits of each of the first and second counting values, and
a number of the plurality of second memory cells corresponds to the number of the bits of each of the first and second counting values.

17. The image sensor as claimed in claim 15, wherein filters of the same color are in the first to M-th subpixels.

18. The image sensor as claimed in claim 15, wherein:
the number of the plurality of transmission lines corresponds to a number of bits of each of the plurality of first and second counting values.

* * * * *